(12) United States Patent
Fleischmann et al.

(10) Patent No.: US 9,755,268 B2
(45) Date of Patent: Sep. 5, 2017

(54) GEL ELECTROLYTES AND ELECTRODES

(71) Applicants: Sion Power Corporation, Tucson, AZ (US); BASF SE, Ludwigshafen (DE)

(72) Inventors: Sven Fleischmann, Ludwigshafen (DE); Christine Bunte, Mainz (DE); Yuriy V. Mikhaylik, Tucson, AZ (US); Veronika G. Viner, Tucson, AZ (US)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 65 days.

(21) Appl. No.: 14/668,102

(22) Filed: Mar. 25, 2015

(65) Prior Publication Data

US 2015/0280277 A1    Oct. 1, 2015

Related U.S. Application Data

(60) Provisional application No. 61/970,950, filed on Mar. 27, 2014.

(51) Int. Cl.
| | |
|---|---|
| *H01M 10/052* | (2010.01) |
| *H01M 10/0565* | (2010.01) |
| *H01M 4/38* | (2006.01) |
| *H01M 4/136* | (2010.01) |

(Continued)

(52) U.S. Cl.
CPC ......... *H01M 10/052* (2013.01); *H01M 4/136* (2013.01); *H01M 4/1397* (2013.01); *H01M 4/38* (2013.01); *H01M 4/382* (2013.01); *H01M 4/622* (2013.01); *H01M 10/0565* (2013.01); *H01M 2300/0025* (2013.01); *H01M 2300/0085* (2013.01); *Y02P 70/54* (2015.11)

(58) Field of Classification Search
CPC ................. H01M 10/0565; H01M 10/052
See application file for complete search history.

(56) References Cited

U.S. PATENT DOCUMENTS

| | | | |
|---|---|---|---|
| 5,853,914 A | 12/1998 | Kawakami | |
| 5,965,300 A | * 10/1999 | Lee ................. | H01M 10/0565 |
| | | | 429/314 |
| 6,153,337 A | 11/2000 | Carlson et al. | |

(Continued)

OTHER PUBLICATIONS

International Search Report and Written Opinion for PCT/EP2015/056332 mailed Aug. 5, 2015.

*Primary Examiner* — Olatunji Godo
(74) *Attorney, Agent, or Firm* — Wolf, Greenfield & Sacks, P.C.

(57) ABSTRACT

Gel electrolytes, especially gel electrolytes for electrochemical cells, are generally described. In some embodiments, the gel electrolyte layers comprise components a) to c). Component a) may be at least one layer of at least one polymer comprising polymerized units of: a1) at least one monomer containing an ethylenically unsaturated unit and an amido group and a2) at least one crosslinker. Component b) may be at least one conducting salt and component c) may be at least one solvent. Electrodes may comprise the components a), d) and e), wherein component a) may be at least one layer of at least one polymer as described herein. Component d) may be at least one electroactive layer and component e) may be at least one ceramic layer. Furthermore, electrochemical cells comprising component a) which may be at least one layer of at least one polymer as described herein, are also provided.

14 Claims, 2 Drawing Sheets

(51) Int. Cl.
*H01M 4/1397* (2010.01)
*H01M 4/62* (2006.01)

(56) References Cited

U.S. PATENT DOCUMENTS

| | | |
|---|---|---|
| 7,247,408 B2 | 7/2007 | Skotheim et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,105,717 B2 | 1/2012 | Skotheim et al. |
| 8,197,971 B2 | 6/2012 | Skotheim et al. |
| 8,338,034 B2 | 12/2012 | Affinito et al. |
| 8,404,376 B2 | 3/2013 | Snyder et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 2002/0012846 A1 | 1/2002 | Skotheim et al. |
| 2004/0197662 A1* | 10/2004 | Maruyama ............ C08F 8/14 429/303 |
| 2006/0222954 A1 | 10/2006 | Skotheim et al. |
| 2007/0224502 A1 | 9/2007 | Affinito et al. |
| 2008/0014501 A1 | 1/2008 | Skotheim et al. |
| 2008/0057397 A1 | 3/2008 | Skotheim et al. |
| 2008/0213672 A1 | 9/2008 | Skotheim et al. |
| 2009/0291353 A1 | 11/2009 | Affinito et al. |
| 2010/0129699 A1 | 5/2010 | Mikhaylik et al. |
| 2010/0291442 A1 | 11/2010 | Wang et al. |
| 2010/0327811 A1 | 12/2010 | Affinito et al. |
| 2011/0068001 A1 | 3/2011 | Affinito et al. |
| 2011/0177398 A1 | 7/2011 | Affinito et al. |
| 2012/0043940 A1 | 2/2012 | Affinito et al. |
| 2012/0052397 A1 | 3/2012 | Mikhaylik et al. |
| 2012/0276449 A1 | 11/2012 | Skotheim et al. |
| 2013/0017441 A1 | 1/2013 | Affinito et al. |
| 2013/0095380 A1 | 4/2013 | Affinito et al. |
| 2013/0143096 A1 | 6/2013 | Affinito et al. |
| 2013/0216915 A1 | 8/2013 | Affinito et al. |
| 2013/0280605 A1 | 10/2013 | Affinito et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Safont Sempere et al. |
| 2014/0127419 A1 | 5/2014 | Fleischmann et al. |
| 2014/0127577 A1 | 5/2014 | Fleischmann et al. |
| 2014/0205912 A1 | 7/2014 | Skotheim et al. |
| 2014/0272565 A1 | 9/2014 | Gronwald et al. |
| 2014/0272594 A1 | 9/2014 | Safont-Sempere et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |

\* cited by examiner

GEL ELECTROLYTES AND ELECTRODES

RELATED APPLICATIONS

This application claims priority under 35 U.S.C. §119(e) to U.S. Provisional Application Ser. No. 61/970,950, entitled "New Gel Electrolytes and Electrodes," filed Mar. 27, 2014, which is incorporated herein by reference in its entirety for all purposes.

STATEMENT REGARDING FEDERALLY SPONSORED RESEARCH AND DEVELOPMENT

This invention was made with government support under Grant No. DE-AR0000067 awarded by the Department of Energy ARPA-E program (ARPA-E BEEST DE-FOA-00000207-1536). The government has certain rights in the invention.

TECHNICAL FIELD

Gel electrolytes, especially gel electrolytes for electrochemical cells, are generally described.

SUMMARY

Gel electrolytes, especially gel electrolytes for electrochemical cells, are provided. Associated systems and methods are generally described.
In one set of embodiments, a gel electrolyte is provided. In one embodiments, a gel electrolyte comprises components a) to c) with
  a) at least one layer of at least one polymer comprising polymerized units of a1) and a2):
    a1) at least one monomer containing i) an ethylenically unsaturated unit and ii) an amido group, wherein the carbon atom of the amido group is linked via a chemical bond to one of the carbon atoms of the ethylenically unsaturated unit, and
    a2) at least one crosslinker containing i) at least two ethylenically unsaturated units and ii) a spacer with at least two carbon atoms, wherein two of the ethylenically unsaturated units are linked together via the spacer;
  b) at least one conducting salt; and
  c) at least one solvent.
In one set of embodiments, an electrode is provided. In one embodiment, the electrode comprises the components a), d) and e) with
  a) at least one layer of at least one polymer comprising polymerized units of a1) and a2):
    a1) at least one monomer containing i) an ethylenically unsaturated unit and ii) an amido group, wherein the carbon atom of the amido group is linked via a chemical bond to one of the carbon atoms of the ethylenically unsaturated unit, and
    a2) at least one crosslinker containing i) at least two ethylenically unsaturated units and ii) a spacer with at least two carbon atoms, wherein two of the ethylenically unsaturated units are linked together via the spacer;
  d) at least one electroactive layer;
  e) at least one ceramic layer;
  wherein the component a) is covered by i) component e) or ii) component d), and component e).
In one set of embodiments, a polymer layer is provided. In one embodiments, a polymer layer comprises components a) to b) with
  a) at least one layer of at least one polymer comprising polymerized units of a1) and a2):
    a1) at least one monomer containing i) an ethylenically unsaturated unit and ii) an amido group, wherein the carbon atom of the amido group is linked via a chemical bond to one of the carbon atoms of the ethylenically unsaturated unit, and
    a2) at least one crosslinker containing i) at least two ethylenically unsaturated units and ii) a spacer with at least two carbon atoms, wherein two of the ethylenically unsaturated units are linked together via the spacer;
  b) at least one conducting salt.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
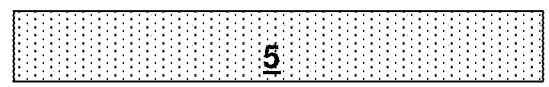
FIG. 1A shows a schematic diagram of a polymer layer according to one set of embodiments.

Gel electrolytes, especially gel electrolytes for electrochemical cells, are provided. In some embodiments, a gel electrolyte comprises components a) to c) as described herein. Component a) may be at least one layer of at least one polymer comprising polymerized units of: a1) at least one monomer containing an ethylenically unsaturated unit and an amido group and a2) at least one crosslinker. Component b) may be at least one conducting salt and component c) may be at least one solvent. In some embodiments, an electrode comprising the components a), d) and e) is also provided. Component a) may be at least one layer of at least one polymer in accordance with the above definitions for a gel electrolyte. Component d) may be at least one electroactive layer and component e) may be at least one ceramic layer. Furthermore, in some embodiments an electrochemical cell comprising component a) which may be at least one layer of at least one polymer as defined above. Use of at least polymer as described above above, for example, as a polymer layer in an electrode, in an electrolyte or in an electrochemical cell, is also provided.

Certain existing electrochemical cells include polymers that are based on acrylate monomers such as polyethylene glycol esters of acrylic acid. These polymers are usually obtained by a rapid polymerization of the respective monomers on an electrode surface (e.g., anode/lithium surface) through a radical polymerization mechanism. Polymers produced from these acrylate monomers still contain ester groups which can be attacked by nucleophilic agents. For example, polysulfides generated during sulfur discharge in an electrochemical cell, in particular in a Li—S-battery, are very strong nucleophiles and can react with ester groups of said polymers based on acrylate monomers. Polysulfide nucleophilic attack on polymer ester groups can lead to i) ester groups transformation into low conductive polymeric thiocarboxylate salt, ii) severing of cross-linking bridges, iii) generation of very viscous and low conductive lithium alkoxides in the solution and/or iv) partial irreversible loss of sulfur.

Certain embodiments described herein provide electrolytes, electrodes and/or electrochemical cells which are more stable versus nucleophilic attack by, for example, polysulfides generated during sulfur discharge in an electrochemical cell containing, for example, a sulfur based electrode, compared to certain existing electrolytes, electrodes and/or electrochemical cells.

In some embodiments, increased stability may be achieved by a gel electrolyte comprising components a) to c) with
- a) at least one layer of at least one polymer comprising polymerized units of a1) and a2):
  - a1) at least one monomer containing i) an ethylenically unsaturated unit and ii) an amido group, wherein the carbon atom of the amido group is linked via a chemical bond to one of the carbon atoms of the ethylenically unsaturated unit, and
  - a2) at least one crosslinker containing i) at least two ethylenically unsaturated units and ii) a spacer with at least two carbon atoms, wherein two of the ethylenically unsaturated units are linked together via the spacer;
- b) at least one conducting salt;
- c) at least one solvent.

In another aspect, increased stability may be achieved by an electrode comprising the components a), d) and e) with
- a) at least one layer of at least one polymer comprising polymerized units of a1) and a2):
  - a1) at least one monomer containing i) an ethylenically unsaturated unit and ii) an amido group, wherein the carbon atom of the amido group is linked via a chemical bond to one of the carbon atoms of the ethylenically unsaturated unit, and
  - a2) at least one crosslinker containing i) at least two ethylenically unsaturated units and ii) a spacer with at least two carbon atoms, wherein two of the ethylenically unsaturated units are linked together via the spacer;
- d) at least one electroactive layer;
- e) at least one ceramic layer;

wherein the component a) is covered (e.g., completely covered) by i) component e) or ii) component d), and component e).

In another aspect, increased stability may be achieved by an electrochemical cell comprising component a) with
- a) at least one layer of at least one polymer comprising polymerized units of a1) and a2):
  - a1) at least one monomer containing i) an ethylenically unsaturated unit and ii) an amido group, wherein the carbon atom of the amido group is linked via a chemical bond to one of the carbon atoms of the ethylenically unsaturated unit, and
  - a2) at least one crosslinker containing i) at least two ethylenically unsaturated units and ii) a spacer with at least two carbon atoms, wherein two of the ethylenically unsaturated units are linked together via the spacer.

In another aspect, increased ability may be achieved by the use of at least one polymer comprising polymerized units of a1) and a2):
- a1) at least one monomer containing i) an ethylenically unsaturated unit and ii) an amido group, wherein the carbon atom of the amido group is linked via a chemical bond to one of the carbon atoms of the ethylenically unsaturated unit, and
- a2) at least one crosslinker containing i) at least two ethylenically unsaturated units and ii) a spacer with at least two carbon atoms, wherein two of the ethylenically unsaturated units are linked together via the spacer as a polymer layer in an electrode, in an electrolyte, in a separator, in a battery, in an article of use in an electrochemical cell or in an electrochemical cell.

Turning now to the figures, FIG. 1A shows a schematic diagram of a polymer layer. The polymer layer may comprise, for example, polymerized units of a1) and a2) as described herein. In certain embodiments, the polymer layer is a gel polymer layer. The polymer layer may include, in certain embodiments, at least one conducting salt (e.g., a lithium salt) and/or at least one solvent. As noted above, the polymer layer may be used in an electrode, in an electrolyte, in a separator, in a battery, in an article of use in an electrochemical cell or in an electrochemical cell.

Figure 1B:
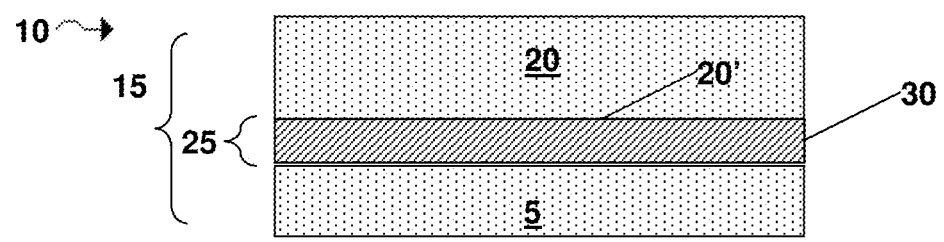
FIG. 1B shows a schematic diagram of an electrode including an electroactive layer, a protective structure, and a polymer layer according to one set of embodiments.

FIG. 1B shows a specific example of a polymer layer configured in an electrode. As shown in this example, article 10 includes an electrode 15 (e.g., an anode or a cathode) including an electroactive layer 20 that comprises an electroactive material (e.g., lithium metal). The electroactive layer may be covered by a protective structure 25 which can include, for example, an ion conductive layer 30 (e.g., a ceramic layer, a glassy layer, a glassy-ceramic layer, and/or a polymeric layer, including those that are conductive to lithium ions) disposed on an active surface 20' of the electroactive layer 20. The protective structure may act as an effective barrier to protect the electroactive material from reaction with certain species in the electrolyte as described herein. As shown illustratively in FIG. 1B, article 10 also includes polymer layer 5 which may be positioned adjacent the protective structure, e.g., on a side opposite the electroactive layer. Polymer layer 5 may be formed from one or more of the polymers disclosed herein (e.g., polymerized units of a1) and a2) as described herein). In certain embodiments in which the polymer layer 5 is an electrolyte (e.g., a gel polymer electrolyte), the electrolyte can function as a medium for the storage and transport of ions.

A layer referred to as being "covering", "covered by," "on," or "adjacent" another layer means that it can be directly covered by, on, or adjacent the layer, or an intervening layer may also be present. For example, a polymer layer described herein that is adjacent an anode or cathode may be directly adjacent the anode or cathode, or an intervening layer (e.g., another protective layer) may be positioned between the anode and the polymer layer. A layer that is "directly covering", "directly covered by", "directly adjacent," "directly on," or "in contact with," another layer means that no intervening layer is present. It should also be understood that when a layer is referred to as being "covering", "covered by," "on," or "adjacent" another layer, it may be covering, covered by, on or adjacent the entire layer or a part of the layer. Likewise, a layer that is positioned "between" two layers may be directly between the two layers such that no intervening layer is present, or an intervening layer may be present.

It should be appreciated that FIG. 1B is an exemplary illustration and that not all components shown in the figure need be present. Likewise, additional components not shown in the figure may be present in the articles described herein. For example, protective structure 25 may be a multilayer structure including 3, 4, 5, or more layers in some embodiments. In other embodiments, the configuration of components may be different than that shown in FIG. 1B. For instance, the position of the protective structure and the polymer layer may be reversed in some embodiments (e.g., the polymer layer may be in direct contact with the electroactive layer, followed by the protective structure on the other side of the polymer layer.) In some such embodiments, the polymer layer is not in direct contact with a liquid electrolyte to be used in the electrochemical cell in which the electrode is incorporated. Other configurations are also possible.

Figure 1C:
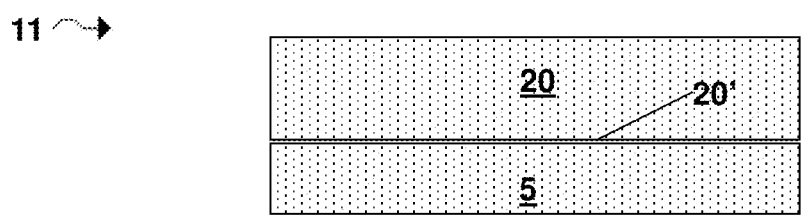
FIG. 1C shows a schematic diagram of an electrode including an electroactive layer and a polymer layer according to one set of embodiments.

FIG. 1C shows an example where ion conductive layer 30 is not present and polymer layer 5 is positioned directly adjacent the electroactive layer. As depicted in FIG. 1C, article 11 (e.g., an electrode) includes electroactive layer 20 which is covered by polymer layer 5. Polymer layer 5 may be formed from the polymers disclosed herein and may be disposed on active surface 20' of the electroactive layer.

Figure 2:
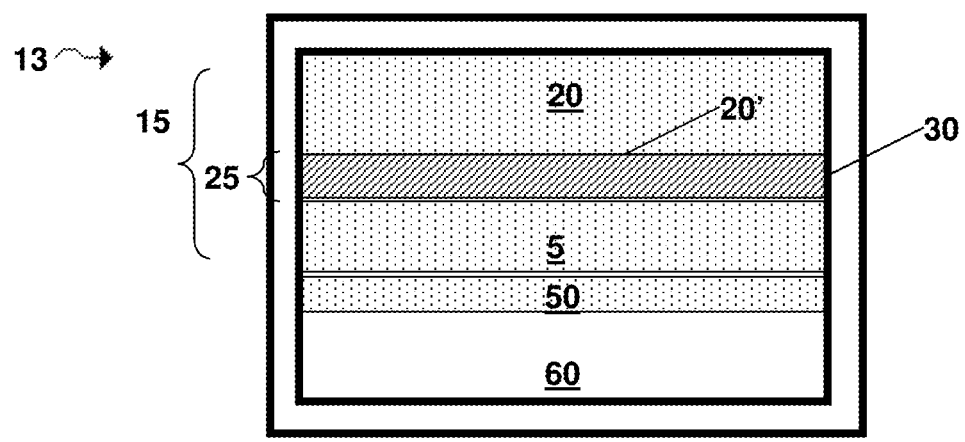
FIG. 2 shows an exemplary electrochemical cell according to one set of embodiments.

A non-limiting example of an electrochemical cell is shown in FIG. 2. Anode 15 of FIG. 1B (or article 11 of FIG. 1C, or other configurations described herein) may be incorporated with other components to form an electrochemical cell 13. The electrochemical cell includes an optional separator 50 positioned adjacent or within the electrolyte. The electrochemical cell may include a cathode 60 comprising a cathode active material.

An advantage of the polymers layers described herein may be that the employed polymers may be stable versus a nucleophilic attack, e.g., versus a nucleophilic attack by soluble lithium polysulfide in an electrochemical cell comprising a sulfur based electrode, such as within a Li/S-battery. These polymers can provide an improved stability versus polymers based on acrylates due to the higher stability of the amide bond of the polymers described herein during a nucleophilic attack by, for example, soluble lithium polysulfides.

Another advantage can be seen in the fact that the monomers to be employed can be rapidly polymerized. This rapid polymerization can be even carried out on the surface of an electrode, for example on the surface of a lithium anode. A rapid polymerization may be important for a higher scale production. In addition, the amido group containing polymers described herein may show a good adhesion on the surface of an electrode, in particular on the surface of a lithium anode, which may also be an advantage in connection with a high scale production.

Furthermore, the employed polymers may have a good swelling behavior, in particular within liquid organic solvent electrolytes. By consequence, these polymers can be successfully employed within the gel electrolytes described herein. The gel electrolytes may comprise, for example, at least one layer of these polymers, at least one conducting salt and one solvent.

The gel electrolytes described herein may also be beneficial in terms of safety matters, since the liquid components of the electrolyte, such as the solvent, are withheld by the polymer in case of the respective gel electrolyte being employed in, for example, an electrochemical cell which is damaged or becomes damaged during operation. By consequence, no leaking or at least reduced leaking of liquid components of the respective electrochemical cell may be observed. Furthermore, the (ionic) conductivity of the gel electrolytes according to the certain embodiments described herein may be similar to that of a conventional pure liquid electrolyte. By consequence, the gel electrolytes described herein may combine the aspects of high stability and high conductivity.

The term "gel electrolyte" means in the context described herein that the respective polymer (layer) according to component a) is in the swollen state ("gel") due to the presence of a solvent. In order to work as an electrolyte (in the classical sense), a conducting salt may also be present, since, in certain embodiments, the polymer according to component a) does not (at all or only in a very limited amount) dissociate into ions like a conventional electrolyte usually does.

Further advantages of the certain embodiments described herein are connected with electrodes comprising at least one layer of a polymer described herein, at least one electroactive layer and at least one protective layer (e.g., an ion conductive layer such as a ceramic layer). In some such embodiments, the polymeric layer may be completely covered (shielded) by either the ceramic layer alone or by the ceramic layer and the electroactive layer. In the latter embodiment, one side of the respective polymer layer may be covered (e.g., completely covered) by the electroactive layer, whereas the remaining sides of the respective layer may be covered (e.g., completely covered (surrounded)/protected) by the ceramic layer. Other configurations are also possible.

In some embodiments, besides its improved stability due to its amide bonds, the polymeric layer may additionally be protected by the protective layer (e.g., an ion conductive layer such as a ceramic layer) and optionally by the electroactive layer, since minimal or no direct contact between the polymeric layer and, for example, a conventional liquid electrolyte containing a nucleophilic agent such as polysulfides occurs within the electrode during operation in an electrochemical cell. Therefore, no or only a (very) reduced swelling may be observed for the polymeric layers according to component a) within such an electrode in some embodiments. By consequence, the electrodes in such embodiments may be also assigned as a "solid polymer electrode". Such electrodes may also combine the aspects of high stability and high conductivity.

In some embodiments, different aspects of embodiments described herein can be combined. For example, in one particular set of embodiments, a gel electrolyte described herein can be combined with an electrode described herein (e.g., a "solid polymer electrode" or electrode including a solid polymer layer). However, in other embodiments, a gel electrolyte described herein can be employed in, for example, an electrochemical cell with conventional (ordinary) electrodes known to a person skilled in the art. The same holds true for the electrodes described herein, which can also be employed within, for example, an electrochemical cell containing a conventional electrolyte known to a person skilled in the art. The respective components a) within these combinations may have the same or different definitions in terms of the number of layers of the polymer, the dimensions of the layer(s) and/or the type of the polymer.

This means in other words that a gel electrolyte described herein may work in electrochemical cells without the presence of such a solid polymer electrode, e.g., a solid polymer Li anode, since conventional electrodes can be employed instead. On the other hand, such a solid polymer electrode, e.g., a solid polymer Li anode, may work in electrochemical cells without the presence of such a gel electrolyte described herein, since conventional electrolytes can be employed instead. However, in one set of embodiments, a gel electrolyte is employed together with at least one solid polymer electrode (e.g., an electrode including a solid polymer), e.g., a solid polymer Li anode. If the solid polymer electrode is a solid polymer Li anode, it may be combined either with a conventional cathode or with a solid polymer cathode, e.g., a solid polymer cathode based on sulfur. Other configurations are also possible.

In the context of disclosure herein, the definitions such as $C_1$-$C_{18}$-alkyl, as defined, for example, below for the $R^5$ radical in formula (I), mean that this substituent (radical) is an alkyl radical having a carbon atom number from 1 to 18. The alkyl radical may be either linear or branched and optionally cyclic. Alkyl radicals which have both a cyclic and a linear component are likewise covered by this definition. The same also applies to other alkyl radicals, for example a $C_1$-$C_5$-alkyl radical or a $C_1$-$C_{10}$-alkyl radical. The alkyl radicals may optionally also be mono- or polysubstituted by functional groups such as amino, quaternary ammonium, hydroxyl, halogen, aryl or heteroaryl. Unless stated otherwise, the alkyl radicals do not have any functional groups as substituents. Examples of alkyl radicals are methyl, ethyl, n-propyl, isopropyl, n-butyl, isobutyl, 2-ethylhexyl, tert-butyl (tert-Bu/t-Bu), cyclohexyl, octyl, stearyl or behenyl.

Certain embodiments described herein are specified further hereinafter.

The subject-matter according to one aspect described herein is a gel electrolyte comprising components a) to c) with a) at least one layer of at least one polymer comprising polymerized units of a1) and a2):
  a1) at least one monomer containing i) an ethylenically unsaturated unit and ii) an amido group, wherein the carbon atom of the amido group is linked via a chemical bond to one of the carbon atoms of the ethylenically unsaturated unit, and
  a2) at least one crosslinker containing i) at least two ethylenically unsaturated units and ii) a spacer with at least two carbon atoms, wherein two of the ethylenically unsaturated units are linked together via the spacer;
b) at least one conducting salt;
c) at least one solvent.

Component a) is at least one layer of at least one polymer comprising polymerized units of a1) and a2):
a1) at least one monomer containing i) an ethylenically unsaturated unit and ii) an amido group, wherein the carbon atom of the amido group is linked via a chemical bond to one of the carbon atoms of the ethylenically unsaturated unit, and
a2) at least one crosslinker containing i) at least two ethylenically unsaturated units and ii) a spacer with at least two carbon atoms, wherein two of the ethylenically unsaturated units are linked together via the spacer.

The polymer according to component a) as such, as well as the respective methods for producing those polymers including the employed monomers a1), a2) and optionally a3), are known to a person skilled in the art. The monomer a2) has crosslinking properties since it contains at least two ethylenically unsaturated units and is, therefore, also described herein as a "crosslinker". The polymer can be obtained by polymerizing the respective monomers as shown in further detail below in connection with, for example, the process for preparing a gel electrolyte described herein as well as in the experimental part of the present application.

In one set of embodiments, the monomer a1) is selected from a compound of the formula (I)

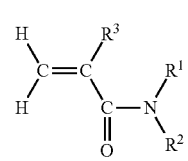

where
$R^1$ is $C_1$-$C_{10}$-alkyl, —$(CHR^4)_m$—X—$R^5$, —$(CHR^6$—$CHR^7$—$O)_m$—$R^5$ or —$(CHR^6$—$CHR^7$—$O)_m$—$(CHR^8$—$CHR^9$—$O)_n$—$(CHR^{10}$—$CHR^{11}$—$O)_o$—$R^5$;
$R^2$ is H, $C_1$-$C_{10}$-alkyl, —$(CHR^4)_m$—X—$R^5$, —$(CHR^6$—$CHR^7$—$O)_m$—$R^5$ or —$(CHR^6$—$CHR^7$—$O)_m$—$(CHR^8$—$CHR^9$—$O)_n$—$(CHR^{10}$—$CHR^{11}$—$O)_o$—$R^5$;
$R^3$, $R^4$ and $R^6$ to $R^{11}$ are each independently H or $C_1$-$C_3$-alkyl;
$R^5$ is H or $C_1$-$C_{18}$-alkyl;
X is O, NH or S;
m and n are each independently an integer from 1 to 16 and o is an integer from 0 to 10.

In some embodiments, the monomer a1) of formula (I) includes the following substituents:
$R^1$ is —$(CHR^4)_m$—O—$R^5$, —$(CHR^6$—$CHR^7$—$O)_m$—$R^5$ or —$(CHR^6$—$CHR^7$—$O)_m$—$(CHR^8$—$CHR^9$—$O)_n$—$(CHR^{10}$—$CHR^{11}$—$O)_o$—$R^5$;
$R^2$ is H or $C_1$-$C_5$-alkyl;
$R^3$, $R^4$ and $R^6$ to $R^{11}$ are each independently H or methyl;
$R^5$ is $C_1$-$C_5$-alkyl;
m and n are each independently an integer from 1 to 10; and o is an integer from 0 to 10.

In certain embodiments, the monomer a1) of formula (I) includes the following substituents:
$R^1$ is —$(CH_2$—$CH_2$—$O)_m$—$R^5$ or —$CH_2$—$CHR^7$—O—$(CH_2$—$CHR^9$—$O)_n$—$(CH_2$—$CHR^{11}$—$O)_o$—$R^5$;
$R^2$ is H;
$R^3$, $R^9$ and $R^{11}$ are each independently H or methyl;
$R^5$ $C_1$-$C_5$-alkyl; and
$R^7$ is H or methyl;
m, n and o are each independently an integer from 2 to 8.

In some embodiments, the monomer a1) is selected from triethyleneglycol monomethylether acrylamide (TEGMAm), diethyleneglycol monobutylether acrylamide (DEGBAm), tetraethyleneglycol monomethylether acrylamide (TETGMAm), triethyleneglycol monobutylether acrylamide (TEGBAm) or poly(ethyleneglycol-co-propyleneglycol) monobutylether acrylamide (PEPPGBAm).

The latter monomers are depicted in scheme I.

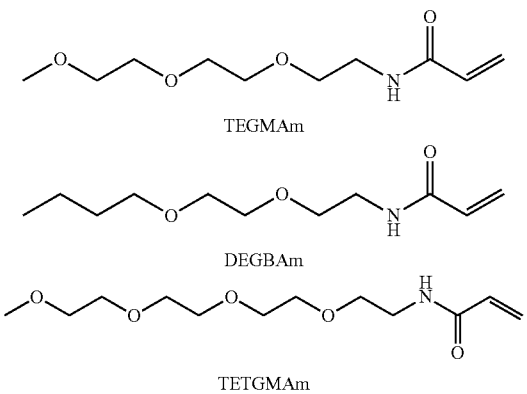

Scheme I

TEGMAm

DEGBAm

TETGMAm

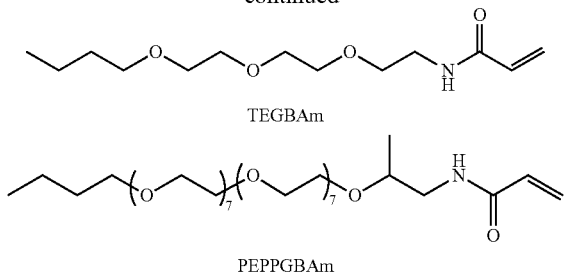

TEGBAm

PEPPGBAm

In some embodiments, the monomer a2) may be selected from a compound of the formula (II)

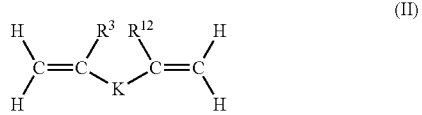

(II)

where
K is —C(O)-L-, —C(O)-L-C(O)— or -L-;
L is —(CHR$^4$)$_m$—, —O—(CHR$^6$—CHR$^7$—O)$_m$—, —O—(CH$_2$)$_o$-(cyclohexylene)-(CH$_2$)$_o$—O—, —NR$^2$—(CHR$^4$)$_p$—NR$^2$—, —NR$^2$—(CHR$^4$)$_p$—O—(CHR$^6$—CHR$^7$—O)$_m$—(CHR$^4$)$_p$—NR$^2$—, —NR$^2$—(CHR$^6$—CHR$^7$—O)$_m$—CHR$^8$—CHR$^9$—NR$^2$— or —NR$^2$—(CHR$^6$—CHR$^7$—O)$_m$—(CHR$^8$—CHR$^9$—O)$_n$—(CHR$^{10}$—CHR$^{11}$—O)$_o$—CHR$^{13}$—CHR$^{14}$—NR$^2$—;
R$^2$ is H, C$_1$-C$_{10}$-alkyl, —(CHR$^4$)$_m$—X—R$^5$, —(CHR$^6$—CHR$^7$—O)$_m$—R$^5$ or —(CHR$^6$—CHR$^7$—O)$_m$—(CHR$^8$—CHR$^9$—O)$_n$—(CHR$^{10}$—CHR$^{11}$—O)$_o$—R$^5$;
R$^3$, R$^4$, and R$^6$ to R$^{14}$ are each independently H or C$_1$-C$_3$-alkyl;
R$^5$ is H or C$_1$-C$_{18}$-alkyl;
m, n and p are each independently an integer from 1 to 16; and
o is an integer from 0 to 10.

In some embodiments, monomer a2) of the formula (II) includes the following substituents:
K is —C(O)-L-C(O)— or -L-;
L is —O—(CHR$^6$—CHR$^7$—O)$_m$—, —NR$^2$—(CHR$^4$)$_p$—O—(CHR$^6$—CHR$^7$—O)$_m$—(CHR$^4$)$_p$—NR$^2$—, —NR$^2$—(CHR$^6$—CHR$^7$—O)$_m$—CHR$^8$—CHR$^9$—NR$^2$— or —NR$^2$—(CHR$^6$—CHR$^7$—O)$_m$—(CHR$^8$—CHR$^9$—O)$_n$—(CHR$^{10}$—CHR$^{11}$—O)$_o$—CHR$^{13}$—CHR$^{14}$—NR$^2$—;
R$^2$ is H or C$_1$-C$_5$-alkyl;
R$^3$, R$^4$, and R$^6$ to R$^{14}$ are each independently H or methyl;
m, n and p are each independently an integer from 1 to 10; and
o is an integer from 0 to 10.

In certain embodiments, monomer a2) of the formula (II) includes the following substituents:
K is —C(O)-L-C(O)— or -L-;
L is —O—(CH$_2$—CH$_2$—O)$_m$—, —NH—(CH$_2$)$_p$—O—(CH$_2$—CH$_2$—O)$_m$—(CH$_2$)$_p$—NH—, —NH—(CH$_2$—CH$_2$—O)$_m$—CH$_2$—CH$_2$—NH— or —NH—(CHR$^6$—CH$_2$—O)$_m$—(CH$_2$—CH$_2$—O)$_n$—(CH$_2$—CHR$^{11}$—O)$_o$—CH$_2$—CHR$^{14}$—NH—;
R$^3$ and R$^{12}$ are each independently H or methyl;
R$^6$, R$^{11}$ and R$^{14}$ are each independently H or methyl;
m and o are each independently an integer from 2 to 5;
n is an integer from 7 to 10; and
p is an integer from 1 to 3.

Within the monomer a2) of the formula (II), in some embodiments:
K is —C(O)-L-C(O)—;
L is —NH—(CH$_2$)$_p$—O—(CH$_2$—CH$_2$—O)$_m$—(CH$_2$)$_p$—NH—, —NH—(CH$_2$—CH$_2$—O)$_m$—CH$_2$—CH$_2$—NH— or —NH—(CHR$^6$—CH$_2$—O)$_m$—(CH$_2$—CH$_2$—O)$_n$—(CH$_2$—CHR$^{11}$—O)$_o$—CH$_2$—CHR$^{14}$—NH—;
R$^3$ and R$^{12}$ are each H;
R$^6$, R$^{11}$ and R$^{14}$ are each methyl;
m and o are each independently an integer from 2 to 5;
n is an integer from 7 to 10; and
p is an integer from 1 to 3.

In some embodiments, the monomer a2) is selected from triethyleneglycol diacrylamide (TEGDAm), 4,7,10-trioxa-1,13-tridecane diacrylamide (TOTDAm), tetraethyleneglycol diacrylamide (TETGDAm) or poly(ethyleneglycol-co-propyleneglyco) diacrylamide (PEPPGDAm).

The latter monomers are depicted in scheme II.

Scheme II

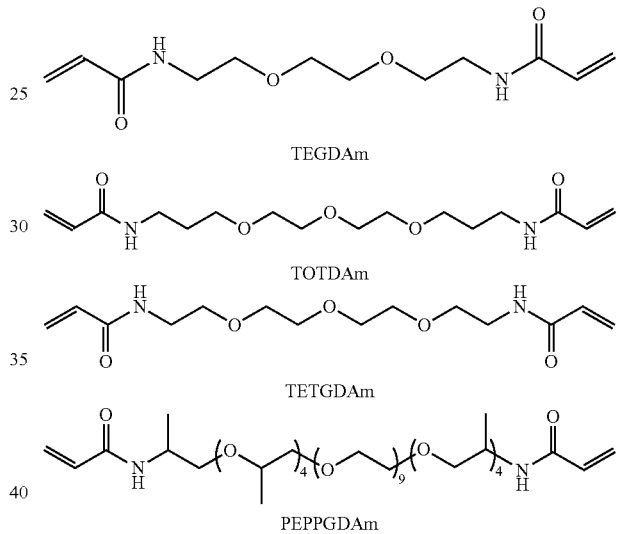

TEGDAm

TOTDAm

TETGDAm

PEPPGDAm

In some embodiments described herein, a polymer according to component a) comprises polymerized units of a1) and a2) with
a1) at least one monomer of the formula (I) as defined above, wherein
R$^1$ is —(CH$_2$—CH$_2$—O)$_m$—R$^5$ or —CH$_2$—CHR$^7$—O—(CH$_2$—CHR$^9$—O)$_n$—(CH$_2$—CHR$^{11}$—O)$_o$—R$^5$;
R$^2$ is H;
R$^3$, R$^9$ and R$^{11}$ are each independently H or methyl;
R$^5$ C$_1$-C$_5$-alkyl; and
R$^7$ is H or methyl;
m, n and o are each independently an integer from 2 to 8,
a2) at least one monomer a2) of the formula (II) as defined above, wherein
K is —C(O)-L-C(O)—;
L is —NH—(CH$_2$)$_p$—O—(CH$_2$—CH$_2$—O)$_m$—(CH$_2$)$_p$—NH—, —NH—(CH$_2$—CH$_2$—O)$_m$—CH$_2$—CH$_2$—NH— or —NH—(CHR$^6$—CH$_2$—O)$_m$—(CH$_2$—CH$_2$—O)$_n$—(CH$_2$—CHR$^{11}$—O)$_o$—CH$_2$—CHR$^{14}$—NH—;
R$^3$ and R$^{12}$ are each H;
R$^6$, R$^{11}$ and R$^{14}$ are each methyl;
m and o are each independently an integer from 2 to 5;
n is an integer from 7 to 10; and
p is an integer from 1 to 3.

In some such embodiments, component a) contains one layer of one polymer comprising polymerized units of a1) and a2) and/or the monomer a1) and/or monomer a2) is selected from the monomers as defined in schemes I and II as defined above.

The polymer according to component a) may additionally comprise polymerized units of a3), with:

a3) at least one further monomer containing an ethylenically unsaturated unit.

In such an embodiment, the polymer according to component a) comprises within this embodiment polymerized units of a1), a2) and a3). Monomers falling under the definition of monomer a3) are known to person skilled in the art. For the sake of completeness, it is indicated that each monomer a3) does not fall under the definitions of monomer a1) or a2), respectively (e.g., monomer a3) is different from monomers a1) and a2)). The monomers a3) may, in some cases, comprise acrylate monomers such as polyethylene glycol esters of acrylic or methacrylic acid. However, in some cases such acrylate monomers are not included in optional monomer a3) due to the above-mentioned problems in connection with a nucleophilic attack by, for example, a polysulfide. If acrylates are employed as optional monomer a3) within the polymers according to component a) described herein, the amount of such acrylates, in some embodiments, does not exceed 5% by weight related to the overall weight of the optional monomer a3). In some cases, the amount of such acrylates does not exceed 5% by weight related to the overall weight of all monomers a1) to a3). For instance, in some embodiments the amount of such acrylates does not exceed 1% by weight related to the overall weight of the optional monomers a1) to a3). As noted above, in some cases the optional monomer a3) does not comprise any acrylates.

In some embodiments, the monomer a3) is styrene, an anionic monomer selected from acrylic acid, methacrylic acid, itaconic acid or maleic acid, or a salt of said anionic monomer.

The amount (in weight-%) of the monomers a1), a2) and optionally a3) to be polymerized in order to obtain a polymer according to component a) may be any amount (ratio) known to a person skilled in the art in order to obtain such polymers according to component a). In some embodiments, the amount of monomer a1) is higher than the amount of monomer a2). If monomer a3) is employed, the respective amount may be smaller than the amount of monomer a1) and/or monomer a2). In some instances, the amount of monomer a3) does not exceed 25 wt.-%, does not exceed 15 wt.-%, does not exceed 5 wt.-%, or is 0 wt.-% (in relation to the total amount of all monomers a1) to a3)).

In some embodiments, the ratio of monomer a2) to monomer a1) is from 1:1 to 1:100 (% by weight/% by weight), e.g., from 10:100 to 1:100 (% by weight/% by weight).

A gel electrolyte described herein may contain one polymer according to component a), but it may contain further polymers falling under this definition, for example, a mixture of 2, 3, 4 or even more of said polymers. However, in some embodiments, the gel contains one polymer as component a). In the context of the disclosure herein, the polymer according to component a) may also assigned as a "copolymer" since it is can include at least two different monomers.

In some embodiments, the polymers according to component a) may be present within a gel electrolyte described herein as a layer of the respective polymer (the polymers form a layered structure). It is possible that the gel electrolyte comprises only one layer of at least one polymer falling under the definition of component a). However, the gel electrolyte may contain 2, 3, 4 or even more layers of at least one polymer according to component a). The individual layers may be formed by only one of those polymers according to component a), or a mixture of 2, 3, 4 or even more of said polymers. By consequence, it is possible to obtain, for example, a gel electrolyte containing as components a) three individual layers of polymers falling under the definition of component a). The individual layers may be the same or different. The first layer may be made, for example, of a first polymer, the second layer may be made of a mixture of a second and a third polymer, whereas the third layer maybe again be made of the first polymer. In some embodiments, however, a gel electrolyte described herein contains as component a) one layer of one polymer falling under the definition of component a).

An individual layer of at least one polymer according to component a) of a gel electrolyte described herein may have any suitable dimensions as known to a person skilled in the art. An exemplary thickness for such a layer is in the range from 1 μm to 20 μm in the dry state and from 10 μm to 50 μm in the swollen (gel) state.

In some embodiments, the thickness of the polymer layer may be, in the dry state, less than or equal to 20 microns, less than or equal to 15 microns, less than or equal to 10 microns, less than or equal to 5 microns, less than or equal to 2.5 microns, less than or equal to 1 micron, In some embodiments, the polymer layer in the dry state may have a thickness of greater than or equal to 0.1 microns, greater than or equal to 1 micron, greater than or equal to 2 microns, greater than or equal to 5 microns, or greater than or equal to 10 microns. Other thicknesses are also possible. Combinations of the above-noted ranges are also possible (e.g., a thickness of greater than or equal to 0.1 microns and less than or equal to 20 microns in the dry state).

In some embodiments, the thickness of the polymer layer may be, in the swollen (gel) state, less than or equal to 50 microns, less than or equal to 40 microns, less than or equal to 30 microns, less than or equal to 20 microns, less than or equal to 15 microns, or less than or equal to 10 microns, In some embodiments, the polymer layer in the swollen (gel) state may have a thickness of greater than or equal to 10 microns, greater than or equal to 20 microns, greater than or equal to 30 microns, or greater than or equal to 40 microns. Other thicknesses are also possible. Combinations of the above-noted ranges are also possible (e.g., a thickness of greater than or equal to 10 microns and less than or equal to 50 microns in the swollen (gel) state).

The polymer layer may be porous and may have any suitable average pore size. For instance, in some embodiments, the polymer layer may have an average pore size of, for example, less than or equal to 5 microns, less than or equal to 2 microns, less than or equal to 1 micron, less than or equal to 500 nm, less than or equal to 300 nm, less than or equal to 100 nm, or less than or equal to 50 nm. In some embodiments, the average pore size may be greater than or equal to 50 nm, greater than or equal to 100 nm, greater than or equal to 300 nm, greater than or equal to 500 nm, or greater than or equal to 1 micron. Other values are also possible. Combinations of the above-noted ranges are also possible (e.g., a pore size of less than or equal to 500 nm and greater than or equal to 100 nm). The above-noted average pore sizes may applicable to the polymer layer in the dry state or the swollen (gel) state.

A polymer described herein can be configured, in some embodiments, to be substantially electronically non-conductive, which can inhibit the degree to which the polymer causes short circuiting of the electrochemical cell. In certain embodiments, a polymer described herein may have a bulk electronic resistivity of at least about $10^4$, at least about $10^5$, at least about $10^{10}$, at least about $10^{15}$, or at least about $10^{20}$ Ohm-meters and/or less than or equal to about $105^{50}$ Ohm-meters. A resulting layer including the polymer may also have a bulk electronic resistivity within one or more of these values.

In some embodiments, component b) of the gel electrolyte is at least one conducting salt.

Conducting salts as such are known to a person skilled in the art. Conducting salts are also known in the art as ionic electrolyte salts (i. e., dissolved ionic salts) which are employed to increase the ionic conductivity. The conducting salt may be chosen from a conducting salt, which can be employed in electrochemical cells, e.g., within Li/S-batteries. In some embodiments, conducting salts based on lithium ions are employed (e.g., lithium salts).

Examples of conducting salts based on lithium ions are LiTFSI (lithium bis(trifluoromethanesulfonyl)imide), LiFSI (lithium bis(fluorosulfonyl)imide), LiI (lithium iodide), $LiPF_6$ (lithium hexafluorophosphate) $LiAsF_6$ (lithium hexafluoroantimonate), LiBOB (lithium bis-oxalatoborate) and derivates thereof. In some embodiments, the conducting salt is $LiPF_6$, LiBOB or LiTFSI. It should be appreciated that the use of other conducting salts is possible.

In certain embodiments, a gel electrolyte described herein may contain only one conducting salt (e.g., as component b)); however, in other embodiments it may contain further conducting salts, for example a mixture of 2, 3, 4 or even more of said conducting salts. In one particular embodiment, the gel electrolyte contains only one conducting salt, e.g., LiTFSI.

As described herein, in some embodiments component c) of the gel electrolyte is at least one solvent.

In the context of the present disclosure, any suitable solvent known to a person skilled in the art, for example in connection with the use of a gel electolyte and/or the use in an electrochemical cell, in particular with the use in a battery, can be employed as a solvent. In some embodiments, a gel electrolyte described herein may contain only one solvent as component c); however, in other embodiments it may contain further solvents, for example a mixture of 2, 3, 4 or even more solvents. In some particular embodiments, a gel electrolyte includes (e.g., as component c)) a mixture of at least two solvents. The solvent may be a non-aqueous solvent, also known in the art as a non-aqueous liquid electrolyte solvent.

Examples of useful non-aqueous solvents include, but are not limited to, non-aqueous organic solvents, such as, for example, N-methyl acetamides, such as dimethylacetaminde (DMAc) acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrolidones, such as N-methyl pyrolidone (NMP), substituted forms of the foregoing, and blends thereof.

Examples of acyclic ethers that may be used include, but are not limited to, diethyl ether, dipropyl ether, dibutyl ether, dimethoxymethane (DME), trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran (THF), 2-methyltetrahydrofuran, 1,4-dioxane, 1,3-dioxolane (DOL), and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In one set of embodiments, the solvent present in a gel electrolyte and/or an electrochemical cell described herein (e.g., according to component c)) is selected from 1,3-dioxolane (DOL) and 1,2-dimethoxyethane (DME), e.g., a 1:1 mixture of 1,3-DOL and 1,2-DME.

In some embodiments, it is also possible that the polymer layer or gel electrolyte comprises further compounds, such as additives (e.g., as a component f)). Such further compounds, in particular additives, are known to a person skilled in the art and are defined below in further detail in connection with the electrochemical cell.

In one set of embodiments, the gel electrolyte comprises components a) to c), with
a) at least one layer of at least one polymer comprising polymerized units of a1) and a2), with:
a1) at least one monomer selected from a compound of formula (I) as described above, where
$R^1$ is $-(CH_2-CH_2-O)_m-R^5$ or $-CH_2-CHR^7-O-(CH_2-CHR^9-O)_n-(CH_2-CHR^{11}-O)_o-R^5$;
$R^2$ is H;
$R^3$, $R^9$ and $R^{11}$ are each independently H or methyl;
$R^5$ $C_1$-$C_5$-alkyl; and
$R^7$ is H or methyl;
m, n and o are each independently an integer from 2 to 8, and
a2) at least one monomer selected from a compound of the formula (II) as defined above, where
K is $-C(O)-L-C(O)-$;
L is $-NH-(CH_2)_p-O-(CH_2-CH_2-O)_m-(CH_2)_p-NH-$, $-NH-(CH_2-CH_2-O)_m-CH_2-CH_2-NH-$ or $-NH-(CHR^6-CH_2-O)_m-(CH_2-CH_2-O)_n-(CH_2-CHR^{11}-O)_o-CH_2-CHR^{14}-NH-$;
$R^3$ and $R^{12}$ are each H;
$R^6$, $R^{11}$ and $R^{14}$ are each methyl;
m and o are each independently an integer from 2 to 5;
n is an integer from 7 to 10; and
p is an integer from 1 to 3;
b) at least one conducting salt selected from $LiPF_6$, LiBOB or LiTFSI;
c) at least one solvent selected from from 1,3-dioxolane (DOL) and 1,2-dimethoxyethane (DME), e.g., a 1:1 mixture of 1,3-DOL and 1,2-DME.

Within this set of embodiments, in some cases component a) includes one layer of one polymer comprising polymerized units of a1) and a2) and/or the monomers a1) and/or a2) are selected from the monomers as depicted in schemes I and II as shown above.

Another subject of the present invention is a process for preparing a gel electrolyte as described herein. Within this process of preparing a gel electrolyte, the individual components a) to c) may be combined with each other by methods known to a person skilled in the art, such as mixing. The individual components can be combined together in any order and/or in any suitable amount. It is also possible to carry out the polymerization process for obtaining a polymer according to component a) in situ, for example, in a solvent according to component c) and/or in the presence of a conducting salt. In some embodiments, the polymer layer according to component a) is obtained by radical polmerization. The radical polymerization may be carried out on the surface of an electrode, e.g., the surface of a Li-anode (e.g., on the surface of an electroactive layer, a protective layer such as an ion conductive layer (e.g., ceramic layer), or any other suitable layer as part of the electrode).

Further subject-matter provided herein include i) the use of a gel electrolyte as described herein in an electrochemical cell or in a battery, ii) an electrochemical cell comprising such a gel electrolyte and iii) a battery comprising such a gel electrolyte. In some embodiments, the electrochemical cell is a battery. The battery itself may be, for example, a Li/S battery.

The term "Li/S battery" or "lithium/sulfur battery", respectively means that the respective battery contains an anode and cathode. The anode itself comprises lithium, whereas the cathode itself comprises sulfur. Specific embodiments of such Li/S batteries are described in more detail below.

Electrochemical cells and/or batteries according to embodiments described herein may contain, besides the above-described gel electrolyte, further components such as at least one electrode, any further conventional electrolyte and/or at least one separator.

Usually, an electrochemical cell and/or a battery comprise two electrodes, which electrodes are one anode and one cathode. The respective electrodes comprise at least one electroactive layer which in turn comprises at least one electroactive material. Respective electrodes may further comprise protective structures, e.g., as a layer, for example a polymer layer and/or an ion conductive layer (e.g., a ceramic layer).

A gel electrolyte described herein may be positioned between the anode on the one hand and the cathode on the other hand of the respective electrochemical cell and/or battery. In some embodiments, the gel electrolyte may be in direct contact with at least one of the electrodes. However, it is not required to have direct contact between the gel electrolyte and the respective electrodes since an electrochemical cell and/or battery may further contain at least one electrolyte, and are more protective layers and/or separators which may fill the space between the gel electrolyte and the electrodes.

In some embodiments, the electrochemical cell, in particular the battery, contains an electrode, which is a Li-anode or a sulfur cathode. In certain embodiments, the electrochemical cell contains one electrode, which is a Li-anode, and one electrode, which is a sulfur cathode.

In certain embodiments, an electrode within an electrochemical cell, in particular within a battery, may include at least one layer of at least one polymer according to component a) as described herein. The number of the layer(s) or the polymer(s), the dimensions of the layer and/or the type of the polymer may be the same or different for the respective descriptions of component a) within the electrode compared to the respective definitions of component a) within the gel electrolyte.

An individual layer of at least one polymer according to component a) being part of an electrode may have any suitable dimensions as known to a person skilled in the art. An exemplary thickness for such a layer is in the range from 1 μm to 20 μm in the dry state and from 10 μm to 50 μm in the swollen (gel) state. Other thicknesses are also possible, as described herein.

In one set of embodiments, a respective electrode containing at least one layer of at least one polymer described herein (e.g., according to component a)) further contains components d) and e) with d) at least one electroactive layer;

e) at least one protective layer (e.g., ion conductive layer such as a ceramic layer);

wherein the component a) is covered (e.g., completely covered) by i) component e) or ii) component d) and component e). Components d) and e) are described herein in connection with, e.g., a "solid polymer electrode"/an electrode comprising the components a), d) and e).

It is also possible, in some embodiments, that the gel electrolyte comprises as a component f) further compounds, such as additives. Such further compounds, in particular additives, are described herein, e.g., in connection with the electrochemical cell.

In some embodiments, the electrochemical cell may include as a component f) at least one further compound, such as an additive, and/or includes lithium in certain embodiments in which the electrochemical cell contains at least one electrode, which is based on lithium, such as a Li-anode. Examples of compounds according to a component f) are selected from guanidinium nitrate, $LiNO_3$, $LiBF_4$, $LiClO_4$, $Li_2SiF_6$, $LiSbF_6$, $LiAlCl_4$, $LiCF_3SO_3$, $LiN(SO_2F)_2$, $LiC(C_nF_{2n+1}SO_2)_3$ wherein n is an integer in the range of from 1 to 20, and salts of the general formula $(C_nF_{2n+1}SO_2)_m$XLi with n being an integer in the range of from 1 to 20, m being 1 when X is selected from oxygen or sulfur, m being 2 when X is selected from nitrogen or phosphorus, and m being 3 when X is selected from carbon or silicium and n is an integer in the range of from 1 to 20. Suitable salts include, for example, $LiC(CF_3SO_2)_3$ and $LiN(CF_3SO_2)_2$.

In one set of embodiments, the electrochemical cell comprises:

i) at least one gel electrolyte comprising components a) to c), with a) at least one layer of at least one polymer comprising polymerized units of a1) and a2), with:

a1) at least one monomer selected from a compound of formula (I) as described above, where $R^1$ is $-(CH_2-CH_2-O)_m-R^5$ or $-CH_2-CHR^7-O-(CH_2-CHR^9-O)_n-(CH_2-CHR^{11}-O)_o-R^5$;

$R^2$ is H;

$R^3$, $R^9$ and $R^{11}$ are each independently H or methyl;

$R^5$ $C_1$-$C_5$-alkyl; and $R^7$ is H or methyl;

m, n and o are each independently an integer from 2 to 8, and a2) at least one monomer selected from a compound of the formula (II) as defined above, where K is $-C(O)$-L-$C(O)-$;

L is $-NH-(CH_2)_p-O-(CH_2-CH_2-O)_m-(CH_2)_p-NH-$, $-NH-(CH_2-CH_2-O)_m-CH_2-CH_2-NH-$ or $-NH-(CHR^6-CH_2-O)_m-(CH_2-CH_2-O)_n-(CH_2-CHR^{11}-O)_o-CH_2-CHR^{14}-NH-$;

$R^3$ and $R^{12}$ are each H;

$R^6$, $R^{11}$ and $R^{14}$ are each methyl;

m and o are each independently an integer from 2 to 5;

n is an integer from 7 to 10; and p is an integer from 1 to 3;

b) at least one conducting salt selected from $LiPF_6$, LiBOB or LiTFSI;

c) at least one solvent selected from from 1,3-dioxolane (DOL) and 1,2-dimethoxyethane (DME), e.g., a 1:1 mixture of 1,3-DOL and 1,2-DME; and ii) at least one electrode comprising the components a), d) and e) with a) at least one layer of at least one polymer comprising polymerized units of a1) and a2), with:

a1) at least one monomer selected from a compound of formula (I) as described above, where $R^1$ is —$(CH_2—CH_2—O)_m$—$R^5$ or —$CH_2$—$CHR^7$—O—$(CH_2—CHR^9—O)_n$—$(CH_2—CHR^{11}—O)_o$—$R^5$;

$R^2$ is H;

$R^3$, $R^9$ and $R^{11}$ are each independently H or methyl;

$R^5$ $C_1$-$C_5$-alkyl; and $R^7$ is H or methyl;

m, n and o are each independently an integer from 2 to 8, and a2) at least one monomer selected from a compound of the formula (II) as defined above, where K is —C(O)-L-C(O)—;

L is —NH—$(CH_2)_p$—O—$(CH_2—CH_2—O)_m$—$(CH_2)_p$—NH—, —NH—$(CH_2—CH_2—O)_m$—$CH_2—CH_2$—NH— or —NH—$(CHR^6—CH_2—O)_m$—$(CH_2—CH_2—O)_n$—$(CH_2—CHR^{11}—O)_o$—$CH_2—CHR^{14}$—NH—;

$R^3$ and $R^{12}$ are each H;

$R^6$, $R^{11}$ and $R^{14}$ are each methyl;

m and o are each independently an integer from 2 to 5;

n is an integer from 7 to 10; and p is an integer from 1 to 3;

d) at least one electroactive layer (e.g., selected from lithium metal or a lithium metal alloy), e) at least one protective layer (e.g., ion conductive layer such as a ceramic layer (e.g., selected from LiPON, $Li_2O$ or $Li_3N$)), wherein the component a) is covered (e.g., completely covered) by i) component e) or ii) component d), and component e).

The respective components a) within this embodiment may have the same or different configurations in terms of the number of the layer(s) or the polymer(s), the dimensions of the layer(s) and/or the type of the polymer(s).

Within this embodiment, in some cases, e.g., both within the gel electrolyte (component i)) and within the electrode (component ii)) the respective component a) contains one layer of one polymer comprising polymerized units of a1) and a2) and/or the monomers a1) and/or a2) are selected from the monomers as depicted in schemes I and II as shown above. The electrode may be, for example, a Li-anode.

In some embodiments, an electrode is provided. The electrode comprises the components a), d) and e) with a) at least one layer of at least one polymer comprising polymerized units of a1) and a2):

a1) at least one monomer containing i) an ethylenically unsaturated unit and ii) an amido group, wherein the carbon atom of the amido group is linked via a chemical bond to one of the carbon atoms of the ethylenically unsaturated unit, and a2) at least one crosslinker containing i) at least two ethylenically unsaturated units and ii) a spacer with at least two carbon atoms, wherein two of the ethylenically unsaturated units are linked together via the spacer;

d) at least one electroactive layer;

e) at least one protective layer (e.g., ion conductive layer such as a ceramic layer);

wherein the component a) is covered (e.g., completely covered) by i) component e) or ii) component d), and component e).

In certain embodiments, the electrode may be considered as a "solid polymer electrode" (as explained above) in connection with the component a). This is due to the fact that the layers of the polymer according to component a) are covered (e.g., completely covered (shielded)) by either the protective layer (e.g., ceramic layer) alone or by the protective layer (e.g., ceramic layer (e.g., component e)) and the electroactive layer (e.g., component d)). Due to this protection by the protective layer (e.g., ceramic layer) and optionally by the electroactive layer, minimal or no direct contact between the polymeric layer according to component a) and, for example, a solvent and/or a conventional liquid electrolyte occurs during operation in, for example, an electrochemical cell. By consequence, the polymer does not (at all or only in a reduced amount) swell due to this protection and can, therefore, be considered as a solid or dry (polymer) layer. The amount (degree) of the (reduced) swelling can be controlled by parameters such us the type and/or thickness of the employed protective layer (e.g., ceramic layer) (e.g., component e)).

In some embodiments, in a two-dimensional perspective of an electrode described herein, a (dry) polymer layer (e.g., according to component a)) is sandwiched between either i) the electroactive layer on the one side and a protective layer (e.g., a ceramic layer) on the other side or ii) between two protective layers (e.g., ceramic layers). In the latter case, the two protective layers (e.g., ceramic layers) may be the same or different. In many cases, one of said two protective layers (e.g., ceramic layers) is connected on the opposite side (e.g., in relation to the polymer layer according to component a)) with the electroactive layer. However in a three dimensional perspective, of an electrode according to certain embodiments described herein, said (dry) polymer layer is in minimal or no direct contact/unprotected from with any solvents causing swelling of said (dry) polymer. It is possible that the protection (coverage) of the polymeric layer according to component a) is partially done by, for example, the housing of an electrochemical cell and/or a battery. This means in the latter case that parts of the protective layer (e.g., ceramic layer (e.g., component e))) and optionally of the electroactive layer (e.g., component d)) are replaced by the housing of an electrochemical cell and/or a battery.

In some embodiments, component a) is at least one layer of at least one polymer comprising polymerized units of a1) and a2) and optionally a3) as described herein, e.g., in connection with a gel electrolyte.

Component d) of the electrode according to certain embodiments described herein is at least one electroactive layer. Suitable electroactive layers (electroactive materials) are known to a person skilled in the art and may be employed as cathode active materials in a cathode and/or as an anode active material in an anode of, for example, an electrochemical cell and/or a battery as described within the context of the description herein. The electrode may include only one electroactive layer (e.g., according to component d)); however, in other embodiments it may contain further electroactive layers, for example 2, 3 or even more electroactive layers. In some embodiments, an electrode, which is an anode, contains a different electroactive layer compared to an electrode, which is a cathode, e.g., in an electrochemical cell described herein.

Suitable electroactive layers for use as cathode active materials in case the electrode is a cathode may include, but are not limited to, electroactive transition metal chalcogenides, electroactive conductive polymers, sulfur, carbon and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive layers for use as cathode active layers (materials) in the electrodes according to the present disclosure include electroactive sulfur-containing materials. "Electroactive sulfur-containing materials," as used herein, relates to cathode active layers which comprise the element sulfur in any form, wherein the electrochemical activity involves the oxidation or reduction of sulfur atoms or moieties. The nature of the electroactive sulfur-containing layers useful in the practice of this invention may vary widely, as known in the art. For example, in one embodiment, the electroactive sulfur-containing layers comprise elemental sulfur. In another embodiment, the electroactive sulfur-containing layers comprise a mixture of elemental sulfur and a sulfur-containing polymer. Thus, suitable electroactive sulfur-containing layers may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

Suitable electroactive layers (materials) for use as anode active layers (materials) in the electrodes described herein present invention include, but are not limited to, lithium metal such as lithium foil and lithium deposited onto a conductive substrate, and lithium alloys (e.g., lithium-aluminum alloys and lithium-tin alloys). While these materials may be used in several embodiments described herein, other cell chemistries are also contemplated. In some embodiments, the anode may comprise one or more binder materials (e.g., polymers, etc.).

In certain embodiments, the electroactive layer is selected from lithium metal or a lithium metal alloy. If the electrode is an anode, it may be, for example, a Li-anode. If the electrode according to the present invention is a cathode, it may be, for example, a sulfur-cathode.

Component e) of the electrode according to certain embodiments described herein is at least one protective layer, such as an ion conductive layer (e.g., a ceramic layer).

The electrode may, in some embodiments, contain only one protective layer (e.g., a ceramic layer, e.g., according to component i)); however, in other embodiments it may contain 2, 3, 4 or even more of those protective layers (e.g., ceramic layers). If an electrode includes 2, 3 or more protective layers (e.g., ceramic layers), the individual layers may be the same or different. The protective layer (e.g., ceramic layer) according to component i) may at least partially, or completely, cover a polymeric layer (e.g., according to component a)) within an electrode described herein.

In certain embodiments, the protective layer (e.g., ceramic layer) is an ionically conductive layer (e.g., an ionically conductive ceramic layer) containing at least one element selected from Li, P, N, O, S or Se (e.g., is conductive to ions of one or more of such elements). In certain embodiments, the ceramic layer is selected from or comprises LiPON, $Li_2O$ or $Li_3N$.

It is also possible that an electrode described herein comprises further compounds/components such as at least one conducting salt (e.g., according to component b)) as described herein or any further compounds (e.g., according to component f)), such as additives, as defined below. However, in some embodiments the electrode does not comprise any further conducting salts and/or additives, in particular not within the polymer layer according to component a).

The electrode may be either an anode or a cathode (e.g., when being employed within an electrochemical cell, in particular in a battery). If the electrode is an anode, it may be a Li-anode. If the electrode is a cathode, it may be a sulfur cathode.

In one embodiment, an electrode comprises the components a), d) and e) with
a) at least one layer of at least one polymer comprising polymerized units of a1) and a2), with:
a1) at least one monomer selected from a compound of formula (I) as described above, where
$R^1$ is $-(CH_2-CH_2-O)_m-R^5$ or $-CH_2-CHR^7-O-(CH_2-CHR^9-O)_n-(CH_2-CHR^{11}-O)_o-R^5$;
$R^2$ is H;
$R^3$, $R^9$ and $R^{11}$ are each independently H or methyl;
$R^5$ $C_1$-$C_5$-alkyl; and
$R^7$ is H or methyl;
m, n and o are each independently an integer from 2 to 8, and
a2) at least one monomer selected from a compound of the formula (II) as defined above, where
K is $-C(O)-L-C(O)-$;
L is $-NH-(CH_2)_p-O-(CH_2-CH_2-O)_m-(CH_2)_p-NH-$, $-NH-(CH_2-CH_2-O)_m-CH_2-CH_2-NH-$ or $-NH-(CHR^6-CH_2-O)_m-(CH_2-CH_2-O)_n-(CH_2-CHR^{11}-O)_o-CH_2-CHR^{14}-NH-$;
$R^3$ and $R^{12}$ are each H;
$R^6$, $R^{11}$ and $R^{14}$ are each methyl;
m and o are each independently an integer from 2 to 5;
n is an integer from 7 to 10; and
p is an integer from 1 to 3;
d) at least one electroactive layer selected from lithium metal or a lithium metal alloy,
e) at least one ceramic layer selected from LiPON, $Li_2O$ or $Li_3N$, wherein the component a) is covered (e.g., completely covered) by i) component e) or ii) component d), and component e).

Within this embodiment, in some cases component a) contains one layer of one polymer comprising polymerized units of a1) and a2) and/or the monomers a1) and/or a2) are selected from the monomers as depicted in schemes I and II as shown above. The electrode may be a Li-anode.

In one set of embodiments, a process for preparing an electrode as described herein is provided. Within this process of preparing an electrode, in some cases the individual components a), d) and e) may be combined with each other by methods known to a person skilled in the art. The individual components can be combined together in any order and/or in any amount. It is also possible to carry out the polymerization process for obtaining a polymer (e.g., according to component a)) in situ, for example, on the surface of an electroactive layer (e.g., according to component d)) or on the surface of a ceramic layer (e.g., according to component e)). In some cases, the polymer layer (e.g., according to component a)) is obtained by radical polymerization. In one particular set of embodiments, the radical polymerization is carried out on the surface of an electrode, e.g., on the surface of the electroactive layer of a Li-anode.

In some embodiments, i) the use of an electrode as described herein in an electrochemical cell or in a battery, ii) an electrochemical cell comprising such an electrode and/or iii) a battery comprising such an electrode, is provided. The electrochemical cell may be a battery. The battery itself may be a Li/S battery.

The term "Li/S battery" or "lithium/sulfur battery", respectively means that the respective battery contains an anode and cathode. The anode itself comprises lithium, whereas the cathode itself comprises sulfur. Specific embodiments of such Li/S batteries are defined in more detail below.

Electrochemical cells and/or batteries described herein may contain, besides (at least one of) the electrodes described herein, further components such as at least one conventional electrode, at least one electrolyte and/or at least one separator. Usually, an electrochemical cell and/or a battery comprise two electrodes, which electrodes are one anode and one cathode. At least one of those electrodes may be an electrode as described herein. The respective electrodes, either conventional ones or those according to those described herein, may comprise at least one electroactive layer which in turn may comprise at least one electroactive material. Respective conventional electrodes may further comprise protective structures, e.g., as a layer, for example a polymer layer.

In some embodiments, an electrochemical cell, in particular a battery, contains an electrode described herein in the form of a Li-anode or a sulfur cathode.

In some embodiments, the electrochemical cell, in particular a battery, further contains at least one additional layer of at least one polymer (e.g., according to component a)) as described herein. The additional polymer layer (e.g., according to component a)) may be present, for example, in an electrolyte, in particular as a gel electrolyte in accordance with certain embodiments described herein. The number of the layer(s) or the polymer(s), the dimensions of the layer(s) and/or the type of the polymer(s) may be the same or different, e.g., for the respective configurations of the additional component (e.g., component a)) within, for example, the electrolyte the compared to the respective definitions of the component (e.g., component a)) within the electrode.

In some embodiments, an individual layer of at least one polymer according to component a) of an electrode may have any suitable dimensions as known to a person skilled in the art. An exemplary thickness for such a layer is in the range from 1 µm to 20 µm in the dry state; however, other thicknesses are also possible as described herein.

In certain embodiments, the respective electrolyte is a gel electrolyte comprising components a) to c) with
a) at least one layer of at least one polymer comprising polymerized units of a1) and a2):
  a1) at least one monomer containing i) an ethylenically unsaturated unit and ii) an amido group, wherein the carbon atom of the amido group is linked via a chemical bond to one of the carbon atoms of the ethylenically unsaturated unit, and
  a2) at least one crosslinker containing i) at least two ethylenically unsaturated units and ii) a spacer with at least two carbon atoms, wherein two of the ethylenically unsaturated units are linked together via the spacer;
b) at least one conducting salt;
c) at least one solvent.

Components b) and c) are described in further detail above in connection with the gel electrolyte, and are generally applicable to other components described herein (e.g., a polymer layer, an electrode, an electrochemical cell).

In one embodiment, the electrochemical cell comprises:
i) at least one gel electrolyte comprises components a) to c), with
a) at least one layer of at least one polymer comprising polymerized units of a1) and a2), with:
  a1) at least one monomer selected from a compound of formula (I) as described above, where
    $R^1$ is $—(CH_2—CH_2—O)_m—R^5$ or $—CH_2—CHR^7—O—(CH_2—CHR^9—O)_n—(CH_2—CHR^{11}—O)_o—R^5$;
    $R^2$ is H;
    $R^3$, $R^9$ and $R^{11}$ are each independently H or methyl;
    $R^5$ $C_1$-$C_5$-alkyl; and
    $R^7$ is H or methyl;
    m, n and o are each independently an integer from 2 to 8, and
  a2) at least one monomer selected from a compound of the formula (II) as defined above, where
    K is $—C(O)-L-C(O)—$;
    L is $—NH—(CH_2)_p—O—(CH_2—CH_2—O)_m—(CH_2)_p—NH—$, $—NH—(CH_2—CH_2—O)_m—CH_2—CH_2—NH—$ or $—NH—(CHR^6—CH_2—O)_m—(CH_2—CH_2—O)_n—(CH_2—CHR^{11}—O)_o—CH_2—CHR^{14}—NH—$;
    $R^3$ and $R^{12}$ are each H;
    $R^6$, $R^{11}$ and $R^{14}$ are each methyl;
    m and o are each independently an integer from 2 to 5;
    n is an integer from 7 to 10; and
    p is an integer from 1 to 3;
b) at least one conducting salt, e.g., selected from $LiPF_6$, LiBOB or LiTFSI;
c) at least one solvent, e.g., selected from from 1,3-dioxolane (DOL) and 1,2-dimethoxyethane (DME), e.g., a 1:1 mixture of 1,3-DOL and 1,2-DME; and
ii) at least one electrode comprising the components a), d) and e) with
a) at least one layer of at least one polymer comprising polymerized units of a1) and a2), with:
  a1) at least one monomer selected from a compound of formula (I) as described above, where
    $R^1$ is $—(CH_2—CH_2—O)_m—R^5$ or $—CH_2—CHR^7—O—(CH_2—CHR^9—O)_n—(CH_2—CHR^{11}—O)_o—R^5$;
    $R^2$ is H;
    $R^3$, $R^9$ and $R^{11}$ are each independently H or methyl;
    $R^5$ $C_1$-$C_5$-alkyl; and
    $R^7$ is H or methyl;

m, n and o are each independently an integer from 2 to 8, and a2) at least one monomer selected from a compound of the formula (II) as defined above, where
K is —C(O)-L-C(O)—;
L is —NH—$(CH_2)_p$—O—$(CH_2$—$CH_2$—O$)_m$—$(CH_2)_p$—NH—, —NH—$(CH_2$—$CH_2$—O$)_m$—$CH_2$—$CH_2$—NH— or —NH—$(CHR^6$—$CH_2$—O$)_m$—$(CH_2$—$CH_2$—O$)_n$—$(CH_2$—$CHR^{11}$—O$)_o$—$CH_2$—$CHR^{14}$—NH—;
$R^3$ and $R^{12}$ are each H;
$R^6$, $R^{11}$ and $R^{14}$ are each methyl;
m and o are each independently an integer from 2 to 5;
n is an integer from 7 to 10; and
p is an integer from 1 to 3;

d) at least one electroactive layer, e.g., selected from lithium metal or a lithium metal alloy,
e) at least one protective layer such as a ceramic layer, e.g., selected from LiPON, $Li_2O$ or $Li_3N$,
wherein the component a) is covered (e.g., completely covered) by i) component e) or ii) component d), and component e).

The respective components a) within this embodiment may have the same or different configurations in terms of the number of the layer(s) or the polymer(s), the dimensions of the layer(s) and/or the type of the polymer(s).

Within this embodiment, in some cases both within the gel electrolyte (component i)) and within the electrode (component ii)) the respective component a) contains one layer of one polymer comprising polymerized units of a1) and a2) and/or the monomers a1) and/or a2) are selected from the monomers as depicted in schemes I and II as shown above. The electrode may be a Li-anode.

In some embodiments, an electrochemical cell comprises component a) with
a) at least one layer of at least one polymer comprising polymerized units of a1) and a2):
    a1) at least one monomer containing i) an ethylenically unsaturated unit and ii) an amido group, wherein the carbon atom of the amido group is linked via a chemical bond to one of the carbon atoms of the ethylenically unsaturated unit, and
    a2) at least one crosslinker containing i) at least two ethylenically unsaturated units and ii) a spacer with at least two carbon atoms, wherein two of the ethylenically unsaturated units are linked together via the spacer.

Component a) may be at least one layer of at least one polymer comprising polymerized units of a1) and a2) and optionally a3), e.g., as described above in connection with gel electrolyte.

In some embodiments, the electrochemical cell may comprise, in addition to at least one layer of at least one polymer according to component a), at least one of the components b) to f) as follows:

Component b) may be at least one conducting salt as described above, e.g., in connection with the gel electrolyte.

Component c) may be at least one solvent as described above, e.g., in connection with the gel electrolyte.

Component d) may be at least one electroactive layer as described above, e.g., in connection with the solid polymer electrode.

Component e) may be at least one ceramic layer as described above, e.g., in connection with the solid polymer electrode.

Component f) may be further compounds, such as additives, as described above, e.g., in connection with the gel electrolyte.

In some embodiments the electrochemical cell is a battery. The battery may be a Li/S battery.

In some embodiments, electrochemical cells and/or batteries described herein may include, in addition to at least one layer of at least one polymer (e.g., according to component a)), further components such as a gel electrolyte described herein, a conventional electrolyte, at least one electrode as described herein, and/or at least one separator.

In some embodiments described herein, an electrochemical cell and/or a battery comprise two electrodes, which electrodes are one anode and one cathode. The respective electrodes comprise at least one electroactive layer which in turn comprises at least one electroactive material. Respective electrodes may further comprise protective structures, e.g., as a layer (e.g., an ion conductive layer), such as a polymer layer and/or a ceramic layer.

In some embodiments, the electrochemical cell, in particular the battery, contains an electrode, e.g., a Li-anode or a sulfur cathode. In some instances, it contains one electrode, which is a Li-anode, and one electrode, which is a sulfur cathode.

In some embodiments, the electrode within an electrochemical cell, in particular within a battery, contains at least one layer of at least one polymer (e.g., according to component a)) as described above. The respective electrode containing at least one layer of at least one polymer (e.g., according to component a)) may further contains components d) and e) with
d) at least one electroactive layer;
e) at least one protective structure (e.g., an ion conductive layer such as a ceramic layer);
wherein the component a) is covered (e.g., completely covered) by i) component e) or ii) component d) and component e). Components d) and e) are described in further detail above, e.g., in connection with the "solid polymer electrode"/an electrode comprising the components a), d) and e).

In some embodiments the electrochemical cell, in particular a battery, further contains at least one layer of at least one polymer (e.g., according to component a)) as described above and the polymer layer (e.g., according to component a)) is present in an electrolyte, in particular in a gel electrolyte.

In some embodiments the respective electrolyte is a gel electrolyte comprising components a) to c) with
a) at least one layer of at least one polymer comprising polymerized units of a1) and a2):
    a1) at least one monomer containing i) an ethylenically unsaturated unit and ii) an amido group, wherein the carbon atom of the amido group is linked via a chemical bond to one of the carbon atoms of the ethylenically unsaturated unit, and
    a2) at least one crosslinker containing i) at least two ethylenically unsaturated units and ii) a spacer with at least two carbon atoms, wherein two of the ethylenically unsaturated units are linked together via the spacer;
b) at least one conducting salt;
c) at least one solvent.

Components a) to c) are described in further detail above in connection with the gel electrolyte.

In one embodiment, the electrochemical cell comprises the components a), b), c), d) and e) with
- a) at least one layer of at least one polymer comprising polymerized units of a1) and a2), with:
  - a1) at least one monomer selected from a compound of formula (I) as described above, where
    $R^1$ is —$(CH_2$—$CH_2$—$O)_m$—$R^5$ or —$CH_2$—$CHR^7$—$O$—$(CH_2$—$CHR^9$—$O)_n$—$(CH_2$—$CHR^{11}$—$O)_o$—$R^5$;
    $R^2$ is H;
    $R^3$, $R^9$ and $R^{11}$ are each independently H or methyl;
    $R^5$ $C_1$-$C_5$-alkyl; and
    $R^7$ is H or methyl;
    m, n and o are each independently an integer from 2 to 8, and
  - a2) at least one monomer selected from a compound of the formula (II) as defined above, where
    K is —C(O)-L-C(O)—;
    L is —$NH$—$(CH_2)_p$—$O$—$(CH_2$—$CH_2$—$O)_m$—$(CH_2)_p$—$NH$—, —$NH$—$(CH_2$—$CH_2$—$O)_m$—$CH_2$—$CH_2$—$NH$— or —$NH$—$(CHR^6$—$CH_2$—$O)_m$—$(CH_2$—$CH_2$—$O)_n$—$(CH_2$—$CHR^{11}$—$O)_o$—$CH_2$—$CHR^{14}$—$NH$—;
    $R^3$ and $R^{12}$ are each H;
    $R^6$, $R^{11}$ and $R^{14}$ are each methyl;
    m and o are each independently an integer from 2 to 5;
    n is an integer from 7 to 10; and
    p is an integer from 1 to 3;
- b) at least one conducting salt, e.g., selected from LiPF$_6$, LiBOB or LiTFSI;
- c) at least one solvent e.g., selected from 1,3-dioxolane (DOL) and 1,2-dimethoxyethane (DME), e.g., a 1:1 mixture of 1,3-DOL and 1,2-DME;
- d) at least one electroactive layer e.g., selected from lithium metal or a lithium metal alloy,
- e) at least one protective layer, such as an ion conductive layer (e.g., a ceramic layer, such as one selected from LiPON, Li$_2$O or Li$_3$N).

Within this embodiment, in some cases component a) contains one layer of one polymer comprising polymerized units of a1) and a2) and/or the monomers a1) and/or a2) are selected from the monomers as depicted in schemes I and II as shown above. The electrode may be, for example, a Li-anode.

In another set of embodiments, a process for preparing an electrochemical cell as described above is provided. Within this process of preparing an electrochemical cell, a component such as component a) and any optional component such as b), c), d) and e) may be combined with each other by methods known to a person skilled in the art. The individual components can be combined together in any order and/or in any suitable amount. It is also possible to carry out the polymerization process for obtaining a polymer (e.g., according to component a)) in situ, for example, in a solvent (e.g., according to component c)), and/or in the presence of a conducting salt, or on the surface of an electroactive layer (e.g., according to component d)) or on the surface of a protective layer such as a ceramic layer (e.g., according to component e)). In some embodiments the polymer layer (e.g., according to component a)) is obtained by radical polmerization. In certain embodiments, the radical polymerization is carried out on the surface of an electrode, e.g., on the surface of a Li-anode.

In certain embodiments, the use of at least one polymer comprising polymerized units of a1) and a2) is provided, wherein:
- a1) at least one monomer containing i) an ethylenically unsaturated unit and ii) an amido group, wherein the carbon atom of the amido group is linked via a chemical bond to one of the carbon atoms of the ethylenically unsaturated unit, and
- a2) at least one crosslinker containing i) at least two ethylenically unsaturated units and ii) a spacer with at least two carbon atoms, wherein two of the ethylenically unsaturated units are linked together via the spacer as a polymer layer in an electrode, in an electrolyte, in a separator, in a battery, in an article of use in an electrochemical cell or in an electrochemical cell.

Component a) may be at least one layer of at least one polymer comprising polymerized units of a1) and a2) and optionally a3) as described above, e.g., in connection with a gel electrolyte.

In some cases, the polymer is used as a layer (in layered form) within the respective applications. In certain embodiments, the polymer layer is obtained by radical polmerization. In some such embodiments, the radical polymerization is carried out on the surface of an electrode, e.g., on the surface of a Li-anode.

In any of the embodiments described herein, the conductivity (e.g., ion conductivity) of the polymer layer may be greater than or equal to about $10^{-6}$ S/cm$^2$, greater than or equal to about $10^{-5}$ S/cm$^2$, greater than or equal to about $10^{-4}$ S/cm$^2$, or greater than or equal to about $10^{-3}$ S/cm$^2$. In some embodiments, the conductivity (e.g., ion conductivity) may be, for example, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, or less than or equal to $10^{-5}$ S/cm. Combinations of the above-referenced ranges are also possible (e.g., a conductivity of greater than or equal to greater than or equal to $10^{-5}$ S/cm and less than or equal to $10^{-3}$ S/cm). Other conductivities are also possible.

The conductivity of the polymer layer may be determined in the dry state. In some embodiments, conductivity may be measured (e.g., in a dry state) in a "capacitor" type cell wherein a layer comprising a polymer (e.g., as described herein) is sandwiched between two electrodes. The electrodes may be inert (e.g., comprising Ni, Pt, Cu, or carbon) or active (e.g., Li, Li-alloy). Full spectra electrochemical impedance may be measured in a range of frequencies (e.g., from 0.1 Hz up to 1 MHz) with voltage amplitude of, for example, ~5-10 mV. The imaginary part of impedance can be plotted versus the real part for full frequencies range. For conductivity calculations the value R (Ohm) of intercept of the graph with real axis at high frequency is used in the formula: s=1/R*T/A, wherein s is the conductivity (S/cm), R is the value of high frequency intercept (Ohm), T is the polymer layer thickness (cm), and A is the polymer film area sandwiched between electrodes (cm$^2$).

It may be desirable to determine if a polymer described herein has advantageous properties as compared to other materials for particular electrochemical systems. Therefore, simple screening tests can be employed to help select between candidate materials. One simple screening test includes positioning a layer of the resulting polymer of the desired chemistry in an electrochemical cell, e.g., as a gel electrolyte layer or a protective layer in a cell. The electrochemical cell may then undergo multiple discharge/charge cycles, and the electrochemical cell may be observed for whether inhibitory or other destructive behavior occurs (e.g., deterioration of an electroactive material surface) compared to that in a control system. If inhibitory or other destructive behavior is observed during cycling of the cell, as compared to the control system, it may be indicative of decomposition, or other possible degradation mechanisms of the polymer, within the assembled electrochemical cell. Using the same electrochemical cell it is also possible to evaluate the electrical conductivity and ion conductivity of the polymer using methods known to one of ordinary skill in the art. The measured values may be compared to select between candidate materials and may be used for comparison with the baseline material in the control. Other tests as described herein can also be used for screening materials.

As described herein, a protective structure/layer such as an ion conductive layer may include, for example, a ceramic layer, a glassy layer, a glassy-ceramic layer, or a polymer layer. Suitable ion conductive materials may include, for example, silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the embodiments described herein can include alloys of lithium and aluminum, magnesium, silicon, indium, and/or tin. While these materials may be preferred in some embodiments, other cell chemistries are also contemplated.

Suitable glasses and/or ceramics include, but are not limited to, those that may be characterized as containing a "modifier" portion and a "network" portion, as known in the art. The modifier may include a metal oxide of the metal ion conductive in the glass or ceramic. The network portion may include a metal chalcogenide such as, for example, a metal oxide or sulfide. For lithium metal and other lithium-containing electrodes, an ion conductive layer may be lithiated or contain lithium to allow passage of lithium ions across it. Ion conductive layers may include layers comprising a material such as lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. The selection of the ion conducting material will be dependent on a number of factors including, but not limited to, the properties of electrolyte and cathode used in the cell.

In certain embodiments in which an ion conductive layer is a polymer (e.g., a secondary polymer which may, or may not, have a structure described herein as for component a)), the polymer may include, for example, polymers that are highly conductive towards metal ions (e.g., lithium ions) and minimally conductive towards electrons. Examples of such secondary polymers include ionically conductive polymers, sulfonated polymers, and hydrocarbon polymers. The selection of the polymer will be dependent upon a number of factors including the properties of electrolyte and cathode used in the cell. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

The polymers can also include crosslinked polymer materials, e.g., formed from the polymerization of monomers such as alkyl acrylates, glycol acrylates, polyglycol acrylates, polyglycol vinyl ethers, and polyglycol divinyl ethers, and polydivinyl poly(ethylene glycol). The crosslinked polymer materials may further comprise salts, for example, lithium salts, to enhance ionic conductivity as described herein.

The protective layer (e.g., ion conductive layer) may be formed or deposited by any suitable method such as using plasma conversion based techniques (e.g., plasma enhanced chemical vacuum deposition (PECVD)), electron beam evaporation, magnetron sputtering, chemical vapor deposition (e.g., laser enhanced chemical vapor deposition), thermal evaporation, jet vapor deposition, laser ablation and any other appropriate formation technique, deposition technique, and/or any appropriate combination thereof. The technique used may depend on the type of material being deposited, the thickness of the layer, etc. Alternatively, the layer of electroactive material may be exposed to a gas, such as nitrogen, under suitable conditions to react with the electroactive material at the surface of the electroactive material layer to form the ion conductive layer.

The thickness of a protective layer (e.g., an ion conductive material layer) may vary over a range from about 1 nm to about 10 microns. For instance, the thickness of the protective layer (e.g., ion conductive material layer) may be between 1-10 nm thick, between 10-100 nm thick, between 100-1000 nm thick, between 1-5 microns thick, or between 5-10 microns thick. In some embodiments, the thickness of a protective layer (e.g., an ion conductive material layer) may be, for example, less than or equal to 10 microns, less than or equal to 5 microns, less than or equal to 1000 nm, less than or equal to 500 nm, less than or equal to 250 nm, less than or equal to 100 nm, less than or equal to 50 nm, less than or equal to 25 nm, or less than or equal to 10 nm. In certain embodiments, the protective layer (e.g., ion conductive layer) may have a thickness of greater than or equal to 10 nm, greater than or equal to 25 nm, greater than or equal to 50 nm, greater than or equal to 100 nm, greater than or equal to 250 nm, greater than or equal to 500 nm, greater than or equal to 1000 nm, or greater than or equal to 1500 nm. Combinations of the above-referenced ranges are also possible (e.g., a thickness of greater than or equal to 10 nm and less than or equal to 500 nm). Other thicknesses are also possible.

In some embodiments, a protective layer (e.g., an ion conductive layer) described herein may have an average ionic conductivity (e.g., lithium ion conductivity) of at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may less than or equal to about 20 S/cm, less than or equal to about 10 S/cm, or less than or equal to 1 S/cm. Conductivity may be measured at room temperature (e.g., 25 degrees Celsius).

In the claims, as well as in the specification above, all transitional phrases such as "comprising," "including," "carrying," "having," "containing," "involving," "holding," and the like are to be understood to be open-ended, i.e., to mean including but not limited to.

It should be understood that the electrochemical cells and components shown in is the figures are exemplary, and the orientation of the components can be varied. Additionally, non-planar arrangements, arrangements with proportions of materials different than those shown, and other alternative arrangements are useful in connection with certain embodiments of the present invention. A typical electrochemical cell could also include, for example, a containment structure, current collectors, external circuitry, and the like. Those of ordinary skill in the art are well aware of the many arrangements that can be utilized with the general schematic arrangement as shown in the figures and described herein.

The following example is intended to illustrate certain embodiments of the present invention, but does not exemplify the full scope of the invention.

EXAMPLES a) General Procedures

Polymeric layers (films) according to component a) described herein were generally prepared by casting a 5 to 50 wt.-% solution of the respective monomer composition in a relatively low boiling and inert solvent like dioxane or methyl ethyl ketone (MEK) on a substrate of choice. In some cases, the solution further contained 5 to 10 wt.-% of LiTFSI as a conducting salt. If tests were conducted in electrolyte, optionally further additives may be present, including substances like $LiNO_3$, guanidinium nitrate or a polysulfide of varying chain length. The curing of the freshly cast polymer layer was accomplished with the radical photoinitiator Irgacure 819 using LED lamps as UV source. The irradiation process occured at $\lambda=385$ nm with a power density of 20 $mW/cm^2$ for 2.5 minutes. For the determination of dry state conductivities, polymeric layers on glass plates were cast and analyzed. In the below experiments, the employed monomers are assigned with abbreviations as explained above in connection with schemes I and II.

b) Dry State Conductivities

Comparative Example b1

100% PEPPGBAm+0% Monomer a2

To a solution of 1.00 g PEPPGBAm and 100 mg LiTFSI in 4.00 ml dioxane, 0.2 ml of a 0.5 wt.-% solution of Irgacure 819 (UV-initiator) in MEK was added. This homogeneous mixture was cast on glass and PET, respectively, by doctor blading adjusting a 200 µm slit. The spread film was subsequently cured by exposure to UV light for 2.5 minutes at maximum intensity. The resulted film was then dried in the oven at 60° C. The dry state ionic conductivity was determined by impedance spectroscopy with the 4-point resistivity or ring-disc electrode, respectively (HighResta®). Conductivity was determined to be $6.5*10^{-6}$ S/cm and the film (polymeric layer of component a)) appeared to be very soft and sticky comprising no mechanical integrity.

Example b2

80% PEPPGBAm+20% PEPPGDAm

To a solution of 1.70 g PEPPGBAm, 0.22 g PEPPGDAm and 196 mg LiTFSI in 10.6 ml dioxane, 0.38 ml of a 0.5 wt.-% solution of Irgacure 819 in MEK was added. This homogeneous mixture was cast on glass and PET, respectively, by doctor blading adjusting a 200 µm slit. The spread film was subsequently cured by exposure to UV light for 2.5 minutes at maximum intensity. The resulted film was then dried in the oven at 60° C. The dry state ionic conductivity was determined by impedance spectroscopy with the 4-point resistivity or ring-disc electrode, respectively (HighResta®). Conductivity was determined to be $3.6*10^{-6}$ S/cm and the film (polymeric layer of component a)) exhibited good mechanical integrity.

Example b3

80% PEPPGBAm+20% TOTDAm

To a solution of 1.28 g PEPPGBAm, 0.35 g TOTDAm and 160 mg LiTFSI in 8.9 ml dioxane, 0.33 ml of a 0.5 wt.-% solution of Irgacure 819 in MEK was added. This homogeneous mixture was cast on glass and PET, respectively, by doctor blading adjusting a 200 µm slit. The spread film was subsequently cured by exposure to UV light for 2.5 minutes at maximum intensity. The resulted film was then dried in the oven at 60° C. The dry state ionic conductivity was determined by impedance spectroscopy with the 4-point resistivity or ring-disc electrode, respectively (HighResta®). Conductivity is determined to be $3.9*10^{-6}$ S/cm and the film (polymeric layer of component a)) exhibited good mechanical integrity.

Comparative Example b4

0% Monomer a1)+100% TOTDAm

To a solution of 1.00 g TOTDAm and 110 mg LiTFSI in 4.00 ml dioxane, 0.2 ml of a 0.5 wt.-% solution of Irgacure 819 in MEK was added. The spread film was subsequently cured by exposure to UV light for 2.5 minutes at maximum intensity. The resulted film was then dried in the oven at 60° C. The dry state ionic conductivity was determined by impedance spectroscopy with the 4-point resistivity or ring-disc electrode, respectively (HighResta®). Conductivity is determined to be $<10^{-9}$ S/cm and the film (polymeric layer of component a)) exhibited good mechanical integrity.

The respective dry state conductivities of the above examples b1) to b4) are summmarized in Table 1. Table 1 contains the respective values for further examples which were carried out/prepared in accordance with the specific disclosure for examples b1) to b4). Working examples are each based on 80 mol-% monomer a1) and 20 mol-% monomer a2) ("crosslinker"). Comparative examples are each based on either 100 mol-% monomer a1) or 100 mol-% crosslinker.

TABLE 1

Composition and dry state Li ion conductivities [S/cm] of UV-cured polyacrylamide films

| crosslinker | monomer a1) | | | | | |
|---|---|---|---|---|---|---|
| | none | TEGMAm | DEGBAm | TETGMAm | TEGBAm | PEPPGBAm |
| none | — | $6.9 \cdot 10^{-8}$ | — | — | $5.7 \cdot 10^{-7}$ | $6.5 \cdot 10^{-6}$ |
| TEGDAm | — | — | — | — | — | — |
| TOTDAm | $<10^{-9}$ | $1.5 \cdot 10^{-8}$ | — | $2.6 \cdot 10^{-7}$ | $2.1 \cdot 10^{-7}$ | $3.6 \cdot 10^{-6}$ |
| TETGDAm | — | — | — | — | — | — |
| PEPPGDAm | $1.4 \cdot 10^{-7}$ | $2.4 \cdot 10^{-7}$ | — | $6.1 \cdot 10^{-7}$ | $6.9 \cdot 10^{-7}$ | $3.9 \cdot 10^{-6}$ | c) Gel State Conductivities and Full Cell Measurements

In this section the performance of the above described materials was evaluated in Nickel pouch cell and full Li/S cell measurements, respectively. In Nickel pouch cells the polymer layers according to component a) were directly prepared on the Nickel substrates by monomer deposition and subsequent UV cure. The built cells comprised the following stack: Nickel/Polymer layer (film)/Separator/Nickel. For these experiments, a polyolefin separator (Celgard 2325) was needed to avoid shortcuts. All cells were filled with the standard electrolyte consisting of (based on weight) 39.5% DOL, 39.5% DME, 16% LiTFSI, 4% LiNO$_3$ and 1% guanidinium nitrate. The filled cells were left for 2 hours to allow for complete and homogeneous electrolyte uptake of the polymer film. By consequence, gel electrolytes were obtained comprising one layer of one polymer (component a)), one conducting salt (component b)) and solvents (component c)).

TABLE 2

Ionic conductivity values in gel state, measured from Ni pouch cells

| example | monomer a1) [Mol-%] | crosslinker [Mol-%] | $t_{total}$ [µm] | $t_{sample}$ [µm] | $R_{total}$ [Ω] | $R_{sample}$ [Ω] | σ [mS/cm] |
|---|---|---|---|---|---|---|---|
| c1 (comparative) | — | TEGDAm (100) | 375 | 76 | 6.5 | 6.5 | 0.078 |
| c2 (comparative) | TEGBAm (100) | — | 455 | 156 | 0.4 | 0.4 | 2.5 |
| c3 | TEGMAm (80) | TOTDAm (20) | 400 | 101 | 1.5 | 1.5 | 0.45 |
| c4 | TEGBAm (80) | TOTDAm (20) | 380 | 81 | 0.8 | 0.8 | 0.69 |
| c5 | TEGBAm (60) | TOTDAm (40) | 400 | 101 | 4.3 | 4.3 | 0.16 |
| c6 (comparative) | — | TOTDAm (100) | 350 | 51 | 0.5 | 0.4 | 0.87 |
| c7 (comparative) | — | PEPPGDAm (100) | 410 | 111 | 0.5 | 0.5 | 1.6 |
| c8 | TEGMAm (80) | PEPPGDAm (20) | 440 | 141 | 0.5 | 0.3 | 2.9 |

It is noted that the function of a Nickel pouch cell is not that of an electrochemical cell since ideally no oxidation/reduction processes take place. Indeed, it is principally a vehicle to measure ionic conductivity throughout a swollen polymer membrane by applying a voltage between the two Nickel electrodes. Taking into account the thickness of the single layers their resistivity and, hence, their conductivity can be determined. In table 2 the generation of the analytical data is displayed. Also, it is stated in Table 2 that the ionic conductivity of the pure standard electrolyte (no gel) was 8.4 mS/cm. As to be expected, the incorporation of a polymer gel significantly reduced the ion mobility and as a result the ionic conductivity of the gel electrolyte was about an order of magnitude lower. One exception is example c2 where the polyacrylamide film was a pure monofunctional monomer c4. The value 2.5 mS/cm appears to be in the range of pure liquid electrolyte simply because the polymer completely dissolved in the DOL/DME mixture. Interesting findings are seen with example c7 and c8. Herein, the crosslinker PEP-PGDAm offers a flexible building block and crosslinked as well as non-crosslinked films provide excellent gel state conductivities.

More specific disclosure for carrying out the experiments as shown in Table 2 is provided/examplified below:

Comparative Example c1

100% Crosslinker TEGDAm

A solution of 1.00 g TEGDAm in 0.30 g dioxane was prepared and 31.2 mg UV initiator Irgacure 819 was added. From this solution films were hand-drawn on the Nickel foil with a doctor blade (30 µm slit) to yield a ~10 µm thick dry polymer layer after curing. Curing was accomplished right after monomer deposition with a UV-LED lamp working at 385 nm wavelength and 20 mW/cm$^2$ power density with an irradiation time of 2.5 minutes. After curing, the solvent was allowed to evaporate at room temperature and complete drying was conducted in the vacuum oven at 70° C. over night. The dried films (polymer layers) were then further manufactured to electrodes in pouch cells with a 25 µm Celgard 2325 separator. Hereby, one electrode is the polymer coated (layered) Ni foil and the second electrode is the pristine, uncoated Nickel substrate. The built cells were then filled with 0.5 ml standard electrolyte of the composition mentioned above. The pouch cells rested for 2 hours to accommodate the electrolyte components completely and homogeneously. The cells were then ready for conductivities measurements via impedance spectroscopy using a Zahner Elektrik IM6 device. The ionic conductivity of the gel was found to be 0.078 mS/cm (too low conductivity). The film was stable in the electrolyte solvent.

Comparative Example c2

100% TEGBAm

A solution of 1.52 g monomer TEGBAm in 0.46 g dioxane was prepared and 24.5 mg UV initiator Irgacure 819 was added. From this solution films were hand-drawn on the Nickel foil with a doctor blade (30 μm slit) to yield a ~10 μm thick dry polymer layer after curing. Curing, drying and cell manufacturing was executed in the same manner as Comparative Example 6. The ionic conductivity of the gel was found to be 2.5 mS/cm. The film readily dissolved in the electrolyte solvent (unstable polymer layer).

Example c8

80% TEGMAm+20% Crosslinker PEPPGDAm

A solution of 1.00 g monomer TEGMAm and 748 mg of crosslinker PEPPGDAm in 0.52 g dioxane was prepared and 24.1 mg UV initiator Irgacure 819 was added. From this solution films were hand-drawn on the Nickel foil with a doctor blade (30 μm slit) to yield a ~10 μm thick dry polymer layer after curing. Curing, drying and cell manufacturing was executed in the same manner as comparative example 6. The ionic conductivity of the gel was found to be 2.9 mS/cm. The film was stable in the electrolyte solvent.

Comparative Example c9

No Polymer Layer, Pure Electrolyte

The ionic conductivity of the liquid standard electrolyte was measured in Pouch cells. It was found to be 8.4 mS/cm.

d) Full Li/S Cell Measurements

Cycling Data of Full Cell Measurements

Full Li/S cells were manufactured as pouch cells containing a 7-fold access of the above described standard electrolyte, Celgard 2325 separator and a standard cathode (55% S, 20% Printex XE2, 20% Vulcan XC72, 5% PVOH; Lot No. LRSFC 9×B 220G Al, double sided 7-25-12). As anode vapor deposited lithium (on copper foil) was used from Sion Power Corporation. All coating experiments and cell designs were conducted in a glove box working under Argon atmosphere. Since lithium is a very soft metal, the coating process with a Mayer rod (40 μm) was accomplished with outmost care in order not to damage or scratch the surface. Doctor-blading of 20 wt.-% monomer solution in dioxane or methyl ethyl ketone (MEK) and subsequent UV-cure ($\lambda$=385 nm, t=2.5 min, S=20 mW/cm$^2$) resulted in 3 to 15 μm dry film thicknesses. The aim of these experiments was to determine whether a polyacrylamide coated Li anode functions as a Li/S cell and if polyacrylamide exhibits higher hydrolytic stability in the polysulfide environment.

TABLE 3

Full Li/S cell analytical data with polymer coated and uncoated lithium anode

| example | monomer a1) [Mol-%] | crosslinker [Mol-%] | $t_{polymer}$ [μm] | $C_{20th\ cycle}$ [mAh/g] | $C_{60th\ cycle}$ [mAh/g] | $n_{max}{}^1$ | $\sigma^2$ [mS/cm] |
|---|---|---|---|---|---|---|---|
| d0 (comparative) | — | — | — | 1007 | 896 | 80 | — |
| d1 (comparative) | — | TEGDAm (100) | 3 | 646 | 617 | 80 | 0.078 |
| d2 (comparative) | TEGBAm (100) | — | 5 | 984 | 859 | 68 | 2.5 |
| d3 | TEGMAm (80) | TOTDAm (20) | 15 | 914 | 769 | 85 | 0.45 |
| d4 | TEGBAm (80) | TOTDAm (20) | 4 | 1022 | 896 | 75 | 0.69 |
| d5 | TEGBAm (60) | TOTDAm (40) | 7 | 716 | 704 | 66 | 0.16 |
| d6 (comparative) | — | TOTDAm (100) | 8 | | | | 0.87 |
| d7 (comparative) | — | PEPPGDAm (100) | 5 | | | | 1.6 |
| d8 | TEGMAm (80) | PEPPGDAm (20) | 7 | | | | 2.9 |

All coatings (polymer layers) were identical to the compositions of the previous Nickel pouch cell measurements for conductivity determination. Coated anodes could be evaluated against a non-coated Li substrate. An overview of the composition can be found in Table 3. As an estimation of specific capacity retention the discharge capacity is denoted after the 20$^{th}$ and 60$^{th}$ cycle. In addition, the maximum cycle number at cell death is taken. A good comparison is then given by ionic conductivity values originating from the Nickel pouch cell data analysis.

Example d0 in Table 3 is an uncoated lithium anode. It started off with 1175 mAh/g discharge capacity to constantly go down from 1007 mAh/g after 20 cycles to 896 mAh/g after 60 cycles. Full capacity was irreversibly lost after 80 cycles and the cell quit abruptly. The thin coating of TEGDAm (Sartomer 259)/(Example 1) gave relatively low ionic conductivity as gel electrolyte and, indeed, high polarization of the cell led to a dramatic decrease of the discharge capacity already at the initial stages of the measurements. After 20 cycles already half of the performance was gone. As to be expected, the coating of a non-crosslinked, soluble polymer on the lithium anode yielded a low overall resistivity and polarization (Example d2). In fact, the performance resembled quite much that one of the standard Example d0 of an uncoated Li anode. Examples d8 gave as stable polymer gel coating on the Li anode. The ionic conductivities are good enough to allow for a high capacity Li/S cell performance.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A gel electrolyte comprising components a) to c) with
   a) at least one layer of at least one polymer comprising polymerized units of a1) and a2)
   a1) at least one monomer containing i) an ethylenically unsaturated unit and ii) an amido group, wherein a carbon atom of the amido group is linked via a chemical bond to one of a carbon atom of the ethylenically unsaturated unit, and
   a2) at least one crosslinker containing i) at least two ethylenically unsaturated units and ii) a spacer with at least two carbon atoms, wherein two of the ethylenically unsaturated units are linked together via the spacer;
   b) at least one conducting salt;
   c) at least one solvent,
   wherein monomer a2) is selected from a compound as in formula (II)

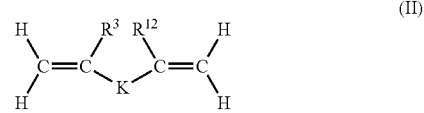

where
   K is —C(O)-L-C(O)—;
   L is —NH—$(CH_2)_p$—O—$(CH_2$—$CH_2$—O$)_m$—$(CH_2)_p$—NH—, —NH—$(CH_2$—$CH_2$—O$)_m$—$CH_2$—$CH_2$—NH— or —NH—$(CHR^6$—$CH_2$—O$)_m$—$(CH_2$—$CH_2$—O$)_n$—$(CH_2$—$CHR^{11}$—O$)_o$—$CH_2$—$CHR^{14}$—NH—;
   $R^3$ and $R^{12}$ are each H;
   $R^6$, $R^{11}$ and $R^{14}$ are each methyl;
   m and o are each independently an integer from 2 to 5;
   n is an integer from 7 to 10; and
   p is an integer from 1 to 3.

2. The gel electrolyte according to claim 1, wherein the polymer additionally comprises polymerized units of a3):
   a3) at least one further monomer containing an ethylenically unsaturated unit.

3. The gel electrolyte according to claim 2, wherein the monomer a3) is styrene, an anionic monomer selected from acrylic acid, methacrylic acid, itaconic acid or maleic acid, or a salt of said anionic monomer.

4. The gel electrolyte according to claim 1, wherein the monomer a1) is selected from a compound as in formula (I)

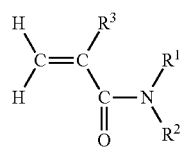

(I)

where
$R^1$ is $C_1$-$C_{10}$-alkyl, —$(CHR^4)_m$—X—$R^5$, —$(CHR^6$—$CHR^7$—$O)_m$—$R^5$ or —$(CHR^6$—$CHR^7$—$O)_m$—$(CHR^8$—$CHR^9$—$O)_m$—$(CHR^{10}$—$CHR^{11}$—$O)_o$—$R^5$;
$R^2$ is H, $C_1$-$C_{10}$-alkyl, —$(CHR^4)_m$—X—$R^5$, —$(CHR^6$—$CHR^7$—$O)_m$—$R^5$ or —$(CHR^6$—$CHR^7$—$O)_m$—$(CHR^8$—$CHR^9$—$O)_m$—$(CHR^{10}$—$CHR^{11}$—$O)_o$—$R^5$;
$R^3$, $R^4$ and $R^6$ to $R^{11}$ are each independently H or $C_1$-$C_3$-alkyl;
$R^5$ is H or $C_1$-$C_{18}$-alkyl;
X is O, NH or S;
m and n are each independently an integer from 1 to 16 and
o is an integer from 0 to 10.

5. The gel electrolyte according to claim 4, wherein in the monomer a1) of the formula (I)
$R^1$ is —$(CHR^4)_m$—O—$R^5$, —$(CHR^6$—$CHR^7$—$O)_m$—$R^5$ or —$(CHR^6$—$CHR^7$—$O)_m$—$(CHR^8$—$CHR^9$—$O)_m$—$(CHR^{10}$—$CHR^{11}$—$O)_o$—$R^5$;
$R^2$ is H or $C_1$-$C_5$-alkyl;
$R^3$, $R^4$ and $R^6$ to $R^{11}$ are each independently H or methyl;
$R^5$ is $C_1$-$C_5$-alkyl;
m and n are each independently an integer from 1 to 10; and
o is an integer from 0 to 10.

6. The gel electrolyte according to claim 5, wherein
$R^1$ is —$(CH_2$—$CH_2$—$O)_m$—$R^5$ or —$CH_2$—$CHR^7$—$O$—$(CH_2$—$CHR^9$—$O)_m$—$(CH_2$—$CHR^{11}$—$O)_o$—$R^5$;
$R^2$ is H;
$R^3$, $R^9$ and $R^{11}$ are each independently H or methyl;
$R^5$ $C_1$-$C_5$-alkyl; and
$R^7$ is H or methyl;
m, n and o are each independently an integer from 2 to 8.

7. The gel electrolyte according to claim 1, wherein the conducting salt is a lithium salt.

8. The gel electrolyte according to claim 1, wherein the ratio of monomer a2) to monomer a1) is from 1:1 to 1:100 (% by weight/% by weight).

9. An electrochemical cell comprising a gel electrolyte according to claim 1.

10. The electrochemical cell according to claim 9, comprising a Li-anode or a sulfur cathode.

11. The electrochemical cell according to claim 10, wherein the electrode comprises at least one layer of at least one polymer according to component a).

12. The electrochemical cell according to claim 11, wherein the electrode further contains components d) and e) with
d) at least one electroactive layer;
e) at least one protective layer;
wherein the component a) is covered by i) component e) or ii) component d) and component e).

13. The electrochemical cell according to claim 12, wherein the protective layer comprises a ceramic layer.

14. The electrochemical cell according to claim 12, wherein the electrochemical cell is a Li/S battery.

* * * * *